US012280599B2

(12) United States Patent
Tanaka

(10) Patent No.: US 12,280,599 B2
(45) Date of Patent: Apr. 22, 2025

(54) RECORDING APPARATUS

(71) Applicant: SEIKO EPSON CORPORATION, Tokyo (JP)

(72) Inventor: Takuto Tanaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 164 days.

(21) Appl. No.: 18/149,731

(22) Filed: Jan. 4, 2023

(65) Prior Publication Data

US 2023/0211611 A1 Jul. 6, 2023

(30) Foreign Application Priority Data

Jan. 6, 2022 (JP) ................................ 2022-001048

(51) Int. Cl.
*B41J 2/165* (2006.01)

(52) U.S. Cl.
CPC ................................ *B41J 2/16588* (2013.01)

(58) Field of Classification Search
CPC .... B41J 2/165; B41J 2/16502; B41J 2/16505; B41J 2/16508; B41J 2/16511; B41J 2/16588
See application file for complete search history.

(56) References Cited

U.S. PATENT DOCUMENTS

| | | | | |
|---|---|---|---|---|
| 2007/0146414 | A1 | 6/2007 | Hiraki | |
| 2020/0047507 | A1* | 2/2020 | Nakai | B41J 2/16505 |
| 2021/0237449 | A1 | 8/2021 | Aoki et al. | |
| 2021/0237480 | A1 | 8/2021 | Amano et al. | |

FOREIGN PATENT DOCUMENTS

| | | | |
|---|---|---|---|
| JP | 2021-121483 | A | 8/2021 |
| JP | 2021-121488 | A | 8/2021 |

* cited by examiner

*Primary Examiner* — Scott A Richmond
(74) *Attorney, Agent, or Firm* — WORKMAN NYDEGGER

(57) ABSTRACT

A maintenance section configured to perform maintenance on a recording section includes a first guided section, which is guided by the guide unit, and a second guided section, which is positioned in a first movement direction, is a direction from the retreat position toward the maintenance position with respect to the first guided section, and is guided by the guide unit, when the maintenance section moves from the maintenance position in the first movement direction, the guide unit is configured to allow pivot accompanied by separation of the second guided section from the guide unit, which is pivot of the maintenance section with the first guided section as a pivot axis, and the first guided section is configured to separate from the guide unit, by moving in the first movement direction after the pivot of the maintenance section is allowed.

14 Claims, 17 Drawing Sheets

RECORDING APPARATUS

The present application is based on, and claims priority from JP Application Serial Number 2022-001048, filed Jan. 6, 2022, the disclosure of which is hereby incorporated by reference herein in its entirety.

BACKGROUND

1. Technical Field

The present disclosure relates to a recording apparatus including a recording section configured to record by ejecting liquid onto a medium.

2. Related Art

JP-A-2021-121483 discloses a configuration in which a head movement unit having a line head, which is a recording head, a maintenance unit having a cap section for capping the line head, and a second maintenance unit having a blade for wiping the line head can move in mutually orthogonal directions.

The maintenance section which maintains the recording head may need to be replaced. For example, when the maintenance section including the cap section in the configuration of JP-A-2021-121483 is to be replaced, it is necessary to pull out the maintenance section straight in an obliquely upward direction along an ink ejection surface until the maintenance section exits from a lower side of the line head. In this case, a large space is required for the maintenance section to exit from the lower side of the line head, and the apparatus becomes large.

SUMMARY

To solving the above problems, a recording apparatus according to a present disclosure includes a recording section configured to record by ejecting liquid onto a medium, a maintenance section configured to move along a movement path, the movement path including a maintenance position at which maintenance of the recording section is performed and a retreat position retreated from the maintenance position, and a guide unit configured to guide the maintenance section along the movement path, wherein the maintenance section includes a first guided section which is guided by the guide unit and a second guided section which is guided by the guide unit, the second guided section being positioned in a first movement direction with respect to the first guided section, the first movement direction being a direction from the retreat position toward the maintenance position, when the maintenance section moves from the maintenance position in the first movement direction, the guide unit allows pivoting of the maintenance section with the first guided section as a pivot axis, the pivoting being accompanied by separation of the second guided section from the guide unit, and the first guided section is configured to separate from the guide unit, by moving in the first movement direction after the pivot of the maintenance section is allowed.

DESCRIPTION OF EMBODIMENT

Figure 1:
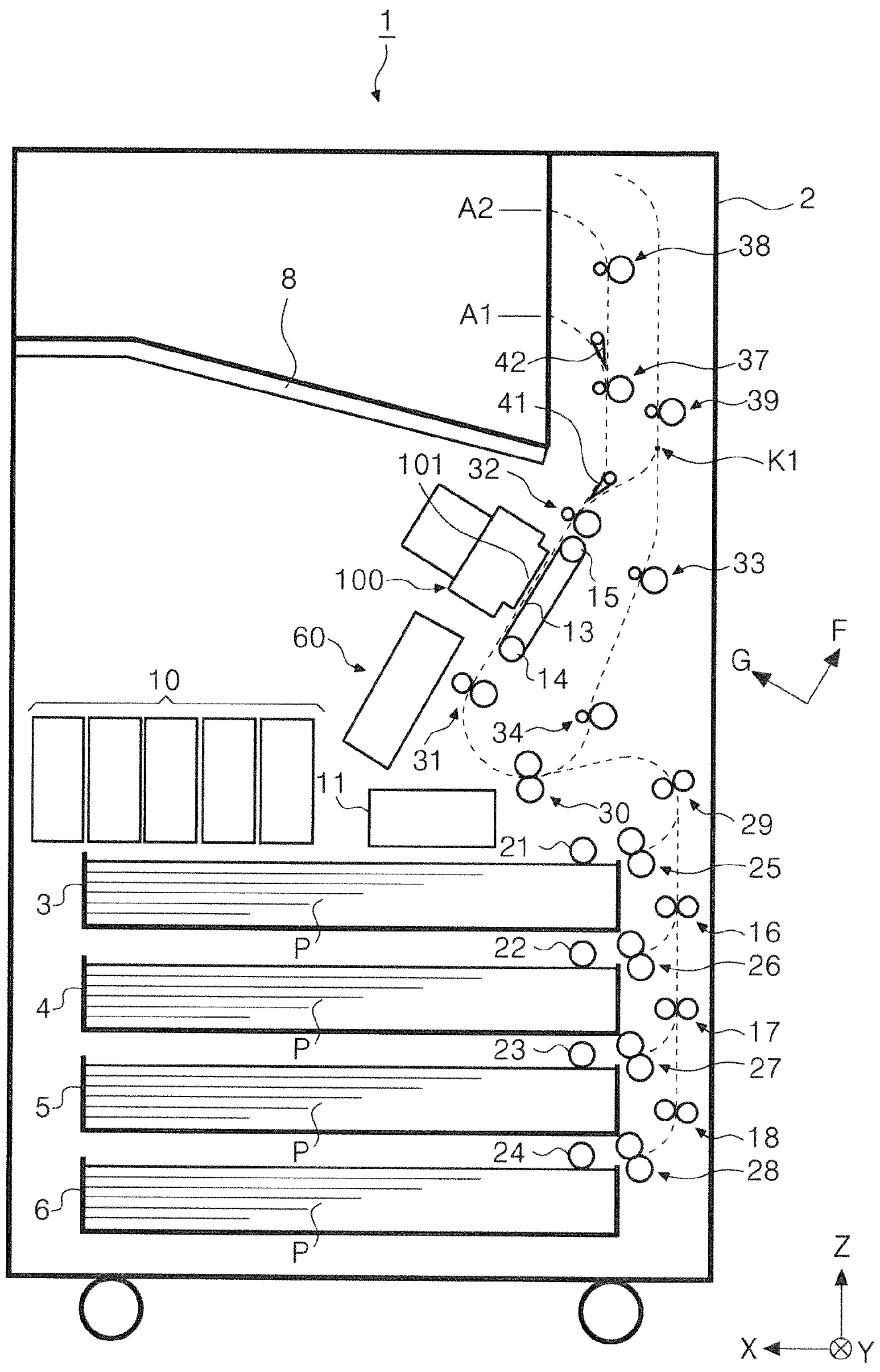
FIG. 1 is a diagram illustrating a medium transport path of a printer.

Hereinafter, the present disclosure will be schematically described.

A recording apparatus according to a first aspect includes a recording section configured to record by ejecting liquid onto a medium, a maintenance section configured to move along a movement path, the movement path including a maintenance position at which maintenance of the recording section is performed and a retreat position retreated from the maintenance position, and a guide unit configured to guide the maintenance section along the movement path, wherein the maintenance section includes a first guided section which is guided by the guide unit and a second guided section which is guided by the guide unit, the second guided section being positioned in a first movement direction with respect to the first guided section, the first movement direction being a direction from the retreat position toward the maintenance position, when the maintenance section moves from the maintenance position in the first movement direction, the guide unit allows pivoting of the maintenance section with the first guided section as a pivot axis, the pivoting being accompanied by separation of the second guided section from the guide unit, and the first guided section is configured to separate from the guide unit, by moving in the first movement direction after the pivot of the maintenance section is allowed.

According to this aspect, when the maintenance section moves from the maintenance position in the first movement direction, the maintenance section becomes pivotable around the first guided section as the pivot axis. By this pivot, the second guided section first separates from the guide unit, and then the first guided section moves in the first movement direction, thereby allowing separation from the guide unit. Accordingly, compared to a configuration in which the first guided section and the second guided section are separated from the guide unit by moving the maintenance section straight in the first movement direction, it is possible to suppress a space necessary for removing the maintenance section, and to suppress an increase in size of the apparatus.

A second aspect according to the first aspect, wherein the guide unit includes a lower guide section configured to support the first guided section and the second guided section at least between the retreat position and the maintenance position in the movement path, and an upper guide section that is located above the lower guide section and when the maintenance section moves from the maintenance position in the first movement direction, the second guided section is released from restriction by the upper guide section, and pivot of the maintenance section, which accompanies the upward movement of the second guided section, is allowed.

According to this aspect, when the maintenance section moves from the maintenance position in the first movement direction, the second guided section is released from restriction by the upper guide section, and pivot of the maintenance section, which accompanies the upward movement of the second guided section, is allowed, the maintenance section can be pivoted upward, that is, the maintenance section can be removed from the upper side, so that workability when the maintenance section is removed becomes easy.

Note that the upward movement of the second guided section does not necessarily mean a straight upward movement of the second guided section in a vertical direction, and may include a vertically upward component.

A third aspect according to the second aspect, wherein the first guided section is provided, with respect to an intersecting direction intersecting with a movement direction of the maintenance section, on a side section of the maintenance section that is the side section in a first direction which is one direction of the intersecting direction and on a side section of the maintenance section that is the side section in a second direction which is the other direction of the intersecting direction, the second guided section is provided on the side section in the first direction and on the side section in the second direction with respect to the intersecting direction, and the guide unit is provided in the first direction and in the second direction of the intersecting direction with respect to the maintenance section.

According to this aspect, since the first guided section and the second guided section are provided on both sides of the maintenance section in the intersecting direction and are guided by the guide unit, the maintenance section can stably move along the movement path.

A fourth aspect according to the third aspect, wherein the first guided section provided on the side section in the first direction includes a first contact section that contacts the guide unit, the first guided section provided on the side section in the second direction includes a second contact section that contacts the guide unit, and the first contact section and the second contact section are at an overlapping position as viewed from the intersecting direction.

According to this aspect, since the first contact section and the second contact section are at an overlapping position as viewed from the intersecting direction, the maintenance section can stably pivot around the first guided section, that is, the first contact section and the second contact section. In addition, it is possible to suppress a space required for pivot of the first contact section and the second contact section, and to suppress an increase in size.

A fifth aspect according to the third or fourth aspect, wherein the second guided section provided on the side section in the first direction and the second guided section provided on the side section in the second direction include at least one contact section that contacts the guide unit, at least one of the second guided section provided on the side section in the first direction and the second guided section provided on the side section in the second direction includes a plurality of the contact sections, and the contact section constituting the second guided section provided on the side section in the first direction and the contact section constituting the second guided section provided on the side section in the second direction do not overlap each other as viewed from the intersecting direction.

According to this aspect, since all the contact sections constituting the second guided section do not overlap as viewed from the intersecting direction, the contact sections constituting the second guided section are shifted in position along the movement direction of the maintenance section. That is, since it is supported by the guide unit in a wide range along the movement direction, even when the maintenance section receives an external force from the recording section, a posture of the maintenance section can be stably maintained.

A sixth aspect according to the fifth aspect, wherein the lower guide section includes a first lower guide section and a second lower guide section spaced apart from the first lower guide section in the first movement direction and in a state in which the maintenance section is at the maintenance position, the first guided section is supported by the first lower guide section, and a part of the second guided section is supported by the second lower guide section.

According to this aspect, since the lower guide section is constituted by the first lower guide section and the second lower guide section, the second guided section may be dropped between the first lower guide section and the second lower guide section. However, according to the fifth aspect described above, since the contact sections constituting the second guided section are shifted in position along the movement direction of the maintenance section, it is possible to prevent the second guided section from being dropped between the first lower guide section and the second lower guide section.

A seventh aspect according to the fifth or sixth aspect, wherein the maintenance section includes a pressed section configured to receive a pressing force from a liquid ejection surface from which the recording section ejects liquid and the pressed section overlaps with a line connecting one contact section constituting the second guided section provided on a side section in the first direction and one contact section constituting the second guided section provided on a side section in the second direction, as viewed from a normal direction with respect to the liquid ejection surface.

Further, the maintenance section includes a pressed section configured to receive a pressing force from a liquid ejection surface from which the recording section ejects liquid and a main body section configured to support the pressed section and includes the first guided section and the second guided section and the pressed section overlaps with a line connecting one contact section constituting the second guided section provided on a side section in the first direction and one contact section constituting the second guided section provided on a side section in the second direction, as viewed from a normal direction with respect to the liquid ejection surface.

According to this aspect, since the cap section overlaps with a line connecting one contact section constituting the second guided section provided on a side section in the first direction and one contact section constituting the second guided section provided on a side section in the second direction, as viewed from a normal direction with respect to the liquid ejection surface, when the pressed section receives the pressing force from the liquid ejection surface, the pressing force can be appropriately received by the plurality of contact sections constituting the second guided section, and the posture of the pressed section is stabilized.

An eighth aspect according to the seventh aspect, wherein the pressed section is a cap section configured to cap the liquid ejection surface.

According to this aspect, in a configuration in which the pressed section is a cap section configured to cap the liquid ejection surface, an action effect of the seventh aspect described above are obtained.

A ninth aspect according to any one of the second to eighth aspects, wherein the movement path includes a vertically upward component from the retreat position toward the maintenance position and a centroid position of the maintenance section in the movement direction of the maintenance section is located in the first movement direction with respect to the center position in the movement direction of the maintenance section.

According to this aspect, since the movement path includes a vertically upward component from the retreat position toward the maintenance position and the centroid position of the maintenance section in the movement direction of the maintenance section is located closer to the first movement direction in the maintenance section, when the maintenance section is taken out from upper side, the heavy side is lifted first, and the maintenance section is easily taken out compared to the opposite case.

A tenth aspect according to any one of the second to ninth aspects, wherein a medium transport path that transports the medium curves downstream of the recording section so as to intersect with the movement path in the case that the movement path is extended in the first movement direction.

According to this aspect, since the medium transport path that transports the medium is curved at downstream of the recording section so as to intersect with the movement path in the case that the movement path is extended in the first movement direction, there is a concern that the maintenance section and the medium transport path interfere with each other when the maintenance section is taken out, since the maintenance unit can be taken out while pivoting due to action effect of the first aspect described above, it is possible to avoid interference between the maintenance unit and the medium transport path.

An eleventh aspect according to any one of the second to tenth aspects, further include a medium receiving section provided vertically above the recording section and configured to receive the medium discharged after recording is performed, wherein a part or all of the medium receiving section is configured to be detachable and attachable or openable and closable and the maintenance section is removable to an outside of the apparatus by detaching or opening the part or all of the medium receiving section.

According to this aspect, since the maintenance section is removable to an outside of the apparatus by detaching or opening the part or all of the medium receiving section, it is possible to secure an opening for taking out the maintenance section to the outside of the apparatus, and it is possible to easily take out and attach the maintenance section.

A twelfth aspect according to any one of the second to eleventh aspects, further includes a transport belt configured to transport the medium is provided at a position opposed to the recording section, wherein the maintenance section moves and pivots in a direction in which the second guided section moves away from the transport belt.

According to this aspect, since a transport belt configured to transport the medium to a position facing the recording section is provided and the maintenance section moves and pivots in a direction in which the second guided section moves away from the transport belt, it is possible to reduce a risk that the maintenance section collides with the transport belt and damages the transport belt.

A thirteenth aspect according to any one of the second to eleventh aspects, wherein the recording section is configured to move between a recording position at which recording is performed on the medium and a separation position at which the recording section is separated from the recording position so as to increase distance between the recording section and the medium, the recording position of the recording section is restricted by the recording section being contact with a position restricting member and the maintenance section moves and pivots in a direction in which the second guided section moves away from the position restricting member.

According to this aspect, since the maintenance section moves and pivots in a direction in which the second guided section moves away from the position restricting member, it is possible to reduce a risk that the maintenance section collides with the position restricting member and damages the position restricting member.

Hereinafter, the present disclosure will be specifically described.

Hereinafter, an inkjet printer 1 that performs recording by ejecting ink, which is an example of a liquid, onto a medium represented by a recording sheet will be described as an example of a recording apparatus. Hereinafter, the inkjet printer 1 will be abbreviated as a printer 1.

An X-Y-Z coordinate system illustrated in each drawing is an orthogonal coordinate system, and a Y-axis direction is the medium width direction, which intersects a transport direction of the medium and is the apparatus depth direction. In the Y-axis direction, a +Y direction is a direction in which an arrow is directed and is a direction from a front surface of the apparatus toward a rear surface of the apparatus, and in the Y-axis direction, a −Y direction opposite to the +Y direction is a direction from the rear surface of the apparatus toward the front surface of the apparatus. In addition, the Y-axis direction is an intersecting direction, which intersects a movement direction of a cap carriage 60 (to be described later), the −Y direction is an example of a first direction, and the +Y direction is an example of a second direction.

Further, an X-axis direction is an apparatus width direction, and a +X direction as a direction in which the arrow is directed as viewed from an operator of the printer 1 is a left side, and a −X direction opposite thereto is a right side. A Z-axis direction is a vertical direction, that is, an apparatus height direction, and a +Z direction is a direction in which the arrow is directed and is an upward direction, and a −Z direction opposite thereto is a downward direction. Hereinafter, unless otherwise stated, “upper” refers to the +Z direction and “lower” refers to the −Z direction.

Further, a G-axis direction is a normal direction with respect to an ink ejection surface 102 of a line head 101 (to be described later), and a +G direction is a direction in which the arrow is directed and is a direction in which the head unit 100 (to be described later) separates from a transport belt 13, and a −G direction opposite thereto is a direction in which the head unit 100 approaches the transport belt 13.

In addition, the F-axis direction is a direction parallel the ink ejection surface 102, and is the transport direction of the medium at a position facing the ink ejection surface 102, and a +F direction as a direction in which the arrow is directed and is downstream in the transport direction, and a −F direction opposite thereto is upstream in the transport direction. Hereinafter, a direction in which the medium is transported may sometimes be referred to as "downstream", and a direction opposite thereto may sometimes be referred to as "upstream".

The F-axis direction is a movement direction of the cap carriage 60 as a maintenance section (to be described later), and the +F direction is the first movement direction and the −F direction is the second movement direction.

In some of the drawings, an F-G-Y coordinate system is shown instead of the X-Y-Z coordinate system for convenience.

In FIG. 1, a medium transport path is indicated by a dashed line. In the printer 1, the medium is transported through the medium transport path indicated by the dashed line.

The printer 1 includes a plurality of medium cassettes along the vertical direction in a lower section of an apparatus main body 2. In this embodiment, a second medium cassette 4, a third medium cassette 5, and a fourth medium cassette 6 are provided in this order downward from an uppermost first medium cassette 3. Reference symbol P denotes the medium contained in each medium cassette.

Each medium cassette is provided with a pickup roller that feeds the medium contained therein. These pickup rollers are denoted by reference symbols 21, 22, 23, and 24.

Each the medium cassette is provided with a feed roller pair that feeds the fed medium obliquely upward direction. The feed roller pairs are denoted by reference symbols 25, 26, 27, and 28. The second medium cassette 4, the third medium cassette 5, and the fourth medium cassette 6 are provided with transport roller pairs that transport the medium upward. The transport roller pairs are denoted by reference symbols 16,17, and 18.

In the following description, a "roller pair" is assumed to be composed of a drive roller driven by a motor (not shown) and a driven roller rotated by contact with the drive roller unless otherwise described.

The medium fed from each medium cassette reaches a transport roller pair 29, receives transporting force from the transport roller pair 29, and is transported in an obliquely upward direction including the +X direction component and the +Z direction component. The medium transport path downstream from the transport roller pair 29 is curved so as to be upwardly convex, and the medium passes through this curved path portion and reaches a transport roller pair 30. The medium that receives transporting force from the transport roller pair 30 is transported in the +X direction, passes through a curved path that curves so as to be downwardly convex, and reaches a transport roller pair 31.

The medium that receives transporting force from the transport roller pair 31 is transported to a position between the line head 101, which is an example of the recording section, and the transport belt 13, that is, a position facing the line head 101. The line head 101 performs recording by ejecting ink, which is an example of liquid, onto the surface of the medium. The line head 101 is an ink ejection head configured such that nozzles (not illustrated) eject ink cover the entire region in the medium width direction, and is configured as an ink ejection head configured to perform recording on the entire region in the medium width direction without moving in the medium width direction.

Reference symbol 10 denotes an ink accommodation section for accommodating ink. The ink ejected from the line head 101 is supplied from the ink accommodation section 10 to the line head 101 via a tube (not shown). The ink accommodation section 10 is composed of a plurality of ink tanks disposed along the X-axis direction.

The transport belt 13 is an endless belt which is wound around a pulley 14 and a pulley 15, and rotates when at least one of the pulley 14 and the pulley 15 is driven by a motor (not shown). The medium is transported to the position facing the line head 101 while being attracted to a belt surface of the transport belt 13. A known attraction method such as an air suction method or an electrostatic attraction method can be adopted for attracting the medium to the transport belt 13.

Here, the medium transport path passing through the position facing the line head 101 intersects both a horizontal direction and the vertical direction, and is configured to transport the medium in the obliquely upward direction. This obliquely upward transport direction is a direction including the −X direction component and the +Z direction component in FIG. 1, and with such a configuration, it is possible to suppress the horizontal direction dimension of the printer 1.

In the present embodiment, the medium transport path passing through the position facing the line head 101 is set at an inclination angle in a range of 50° to 70° with respect to the horizontal direction, and more specifically set at an inclination angle of 60°.

The medium on which recording has been performed on a first surface by the line head 101 is further transmitted in the obliquely upward direction by a transport roller pair 32 positioned downstream of the transport belt 13.

A flap 41 is provided downstream of the transport roller pair 32, and the transport direction of the medium is switched by the flap 41. In a case where the medium is discharged as it is, the transport path of the medium is switched by the flap 41 so as to be directed toward an upper transport roller pair 37. A flap 42 is further provided downstream of the transport roller pair 37, and the transport path is switched by the flap 42 to any one of discharge from the discharge position A1 and transport to a transport roller pair 38 positioned further vertically upward. When the medium is transported toward the transport roller pair 38, the medium is discharged from the discharge position A2.

The medium discharged from the discharge position A1 is received by a discharge tray 8, which is inclined in an obliquely upward direction including a +X direction component and a +Z direction component. The discharge tray 8 is positioned vertically above the head unit 100. The medium discharged from the discharge position A2 is received by an optional tray (not shown).

When recording is to be further performed on a second surface, in addition to the first surface, of the medium, the medium is transported by the flap 41 in an obliquely upward direction including −X direction components and +Z direction components, passes through the branch position K1, and is transported from the branch position K1 into an upper switch-back path. A transport roller pair 39 is provided in the switch-back path, and the medium that entered the switch-back path is transported upward by the transport roller pair 39, and when a rear end of the medium has passed through the branch position K1, the direction of rotation of the transport roller pair 39 is switched, and the medium is transported downward by this.

The medium transported downward by the transport roller pair 39 receives transporting force from a transport roller pair 33 and a transport roller pair 34, reaches the transport roller pair 30, and is again transported to the position facing the line head 101 by the transport roller pair 30.

The medium that is again transported to the position facing the line head 101 faces the line head 101 with its second surface, which is opposite to the first surface on which recording has already been performed. By this, recording by the line head 101 can be performed on the second surface of the medium. The medium on which recording has been performed on the second surface is discharged from the discharge position A1 or the discharge position A2 described above.

Next, operations of the head unit 100, the cap carriage 60, and a wiper carriage 110 will be described with reference to FIGS. 2, 3, and 4.

Figure 6:
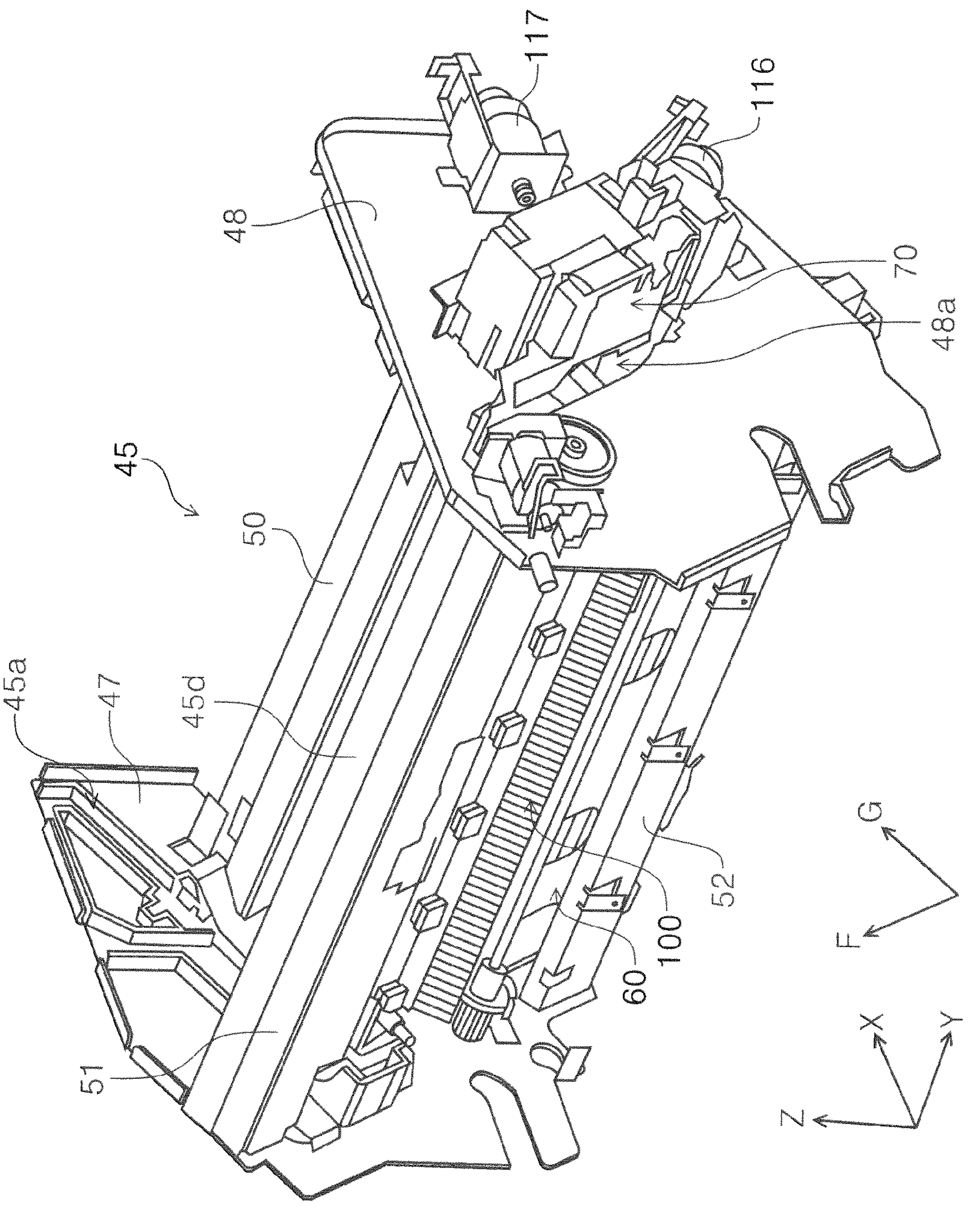
FIG. 6 is a perspective view of a motion unit.

The head unit 100 is a unit including the line head 101 and is provided so as to be movable in the G-axis direction by receiving power of a head moving motor 117 (see FIG. 6). The power of the head moving motor 117 is transmitted to the head unit 100 via a rack-and-pinion mechanism (not shown). Of course, the mechanism for moving the head unit 100 is not limited to the rack-and-pinion mechanism, but may be a belt drive mechanism, a lead screw mechanism, or the like.

In addition, in the embodiment, the head unit 100 is configured to be movable along the G-axis direction, but is not limited thereto, and may be fixedly provided. In that case, for example, the transport belt 13 may retreat from the position facing the line head 101, and instead, the cap carriage 60 or the wiper carriage 110 (to be described later) may be moved to the position facing the line head 101.

The cap carriage 60 is a unit including a cap 71 for covering the line head 101, and is an example of a maintenance section for performing maintenance of the line head 101. The cap 71 is an example of a pressed section that receives a pressing force from the ink ejection surface 102 of the line head 101. The cap carriage 60 is provided to be movable in the F-axis direction by receiving power of a cap drive motor 67 (refer to FIGS. 11 to 14). As will be described in detail later, the movement path of the cap carriage 60 includes a retreat position and a maintenance position, and the +F direction in the F-axis direction is a first movement direction, which is a direction from the retreat position toward the maintenance position. Further, the −F direction is a second movement direction, which is a direction from the maintenance position toward the retreat position.

The power of the cap drive motor 67 is transmitted to the cap carriage 60 via a rack-and-pinion mechanism. The rack-and-pinion mechanism includes a rack section 63*b* provided on the −Y direction side surface of the cap carriage 60 and a pinion 66A (see FIGS. 11 and 13) meshing with the rack section 63*b*, and a rack section 64*b* provided on the +Y direction side surface of the cap carriage 60 and a pinion 66B (see FIGS. 12 and 14) meshing with the rack section 64*b*. The pinions 66A and 66B rotate by receiving power of the cap drive motor 67.

Of course, the mechanism for moving the cap carriage 60 is not limited to the rack-and-pinion mechanism, but may be a belt drive mechanism, a lead screw mechanism, or the like.

The wiper carriage 110 is a unit in which is provided a wiper 112 for wiping the ink ejection surface 102 of the line head 101, and is provided to be movable in the Y-axis direction by receiving power of a wiper movement motor 116 (see FIG. 6). Power of the wiper movement motor 116 is transmitted to the wiper carriage 110 via a belt driving mechanism (not shown). Of course, the mechanism for moving the wiper carriage 110 is not limited to the belt driving mechanism, but may be a rack-and-pinion mechanism, a lead screw mechanism, or the like.

As described above, the head unit 100, the cap carriage 60, and the wiper carriage 110 are provided so as to be movable in mutually orthogonal directions.

Figure 2:
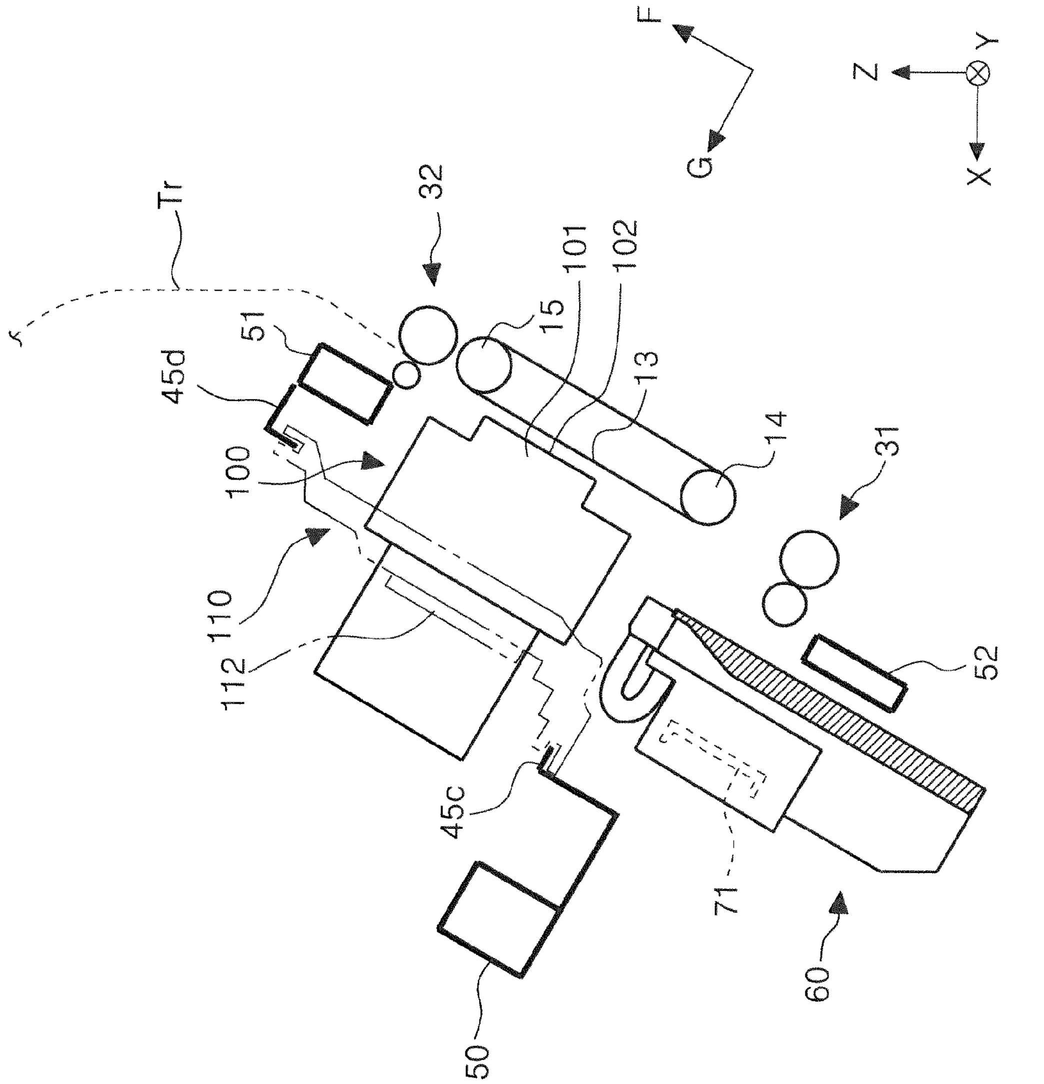
FIG. 2 is a diagram showing position of other units when the head unit is in an ink ejection position.

FIG. 2 shows the position of each unit when recording is performed on the medium by the line head 101. Hereinafter, the position of the head unit 100 in this state is referred to as an ink ejection position. When the head unit 100 is at the ink ejection position, the cap carriage 60 is at the retreat position retreated in the −F direction with respect to the head unit 100, and the wiper carriage 110 is at the home position set in the +Y direction.

Figure 3:
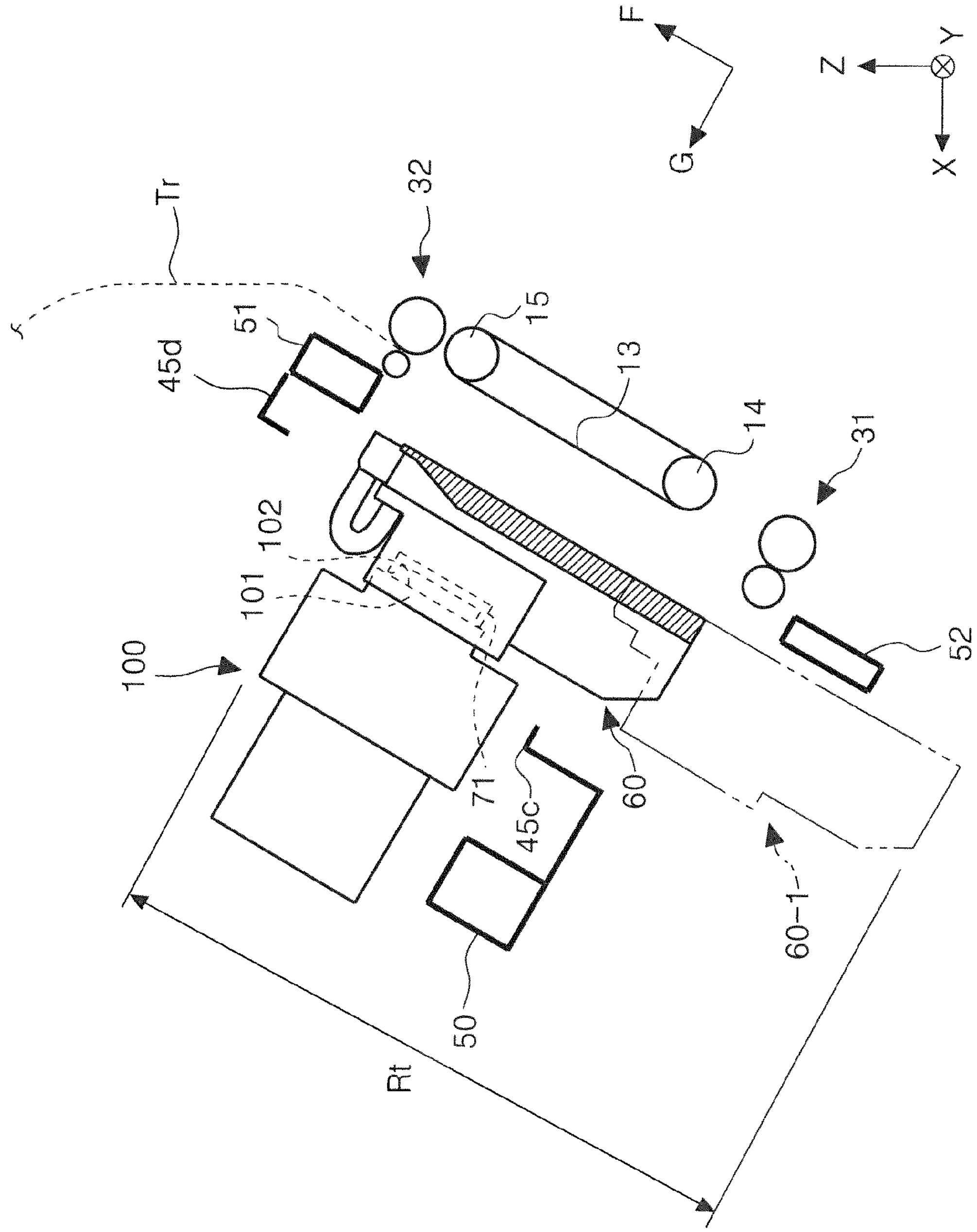
FIG. 3 is a view showing position of other units when the head unit is in a cap position.

FIG. 3 shows the position of each unit when the ink ejection surface 102 is capped with the cap 71. Note that in FIG. 3, the wiper carriage 110 is not shown in order to avoid complication of the drawing, but in this state, as in FIG. 2, the wiper carriage 110 is positioned at the home position set in the +Y direction.

Hereinafter, the position of the head unit 100 shown in FIG. 3 is referred to as a cap position, and the position of the cap carriage 60 is referred to as a maintenance position.

When the head unit 100 moves from the ink ejection position in FIG. 2 to the cap position in FIG. 3, the head unit 100 moves from the ink ejection position in FIG. 2 to a position further in the +G direction than the cap position in FIG. 3. The position of the head unit 100 at this time is referred to as a cap standby position. In a state where the head unit 100 is at the cap standby position, the cap carriage 60 moves from the retreat position to the maintenance position, so that the ink ejection surface 102 and the cap 71 face each other. Then, the head unit 100 slightly moves in the −G direction to the cap position shown in FIG. 3, and the ink ejection surface 102 is capped by the cap 71.

In FIG. 3, reference symbol 60-1 indicates the cap carriage 60 before moving to the maintenance position, that is, the cap carriage 60 at the retreat position. Reference symbol Rt denotes a movement path when the cap carriage 60 moves between the retreat position and the maintenance position. The movement path Rt extends along the F-axis direction at a position in the −G direction with respect to the head unit 100 at the cap standby position.

When the line head 101 performs a flushing operation, the head unit 100 is positioned slightly in the +G direction from the state illustrated in FIG. 3, and the ink ejection surface 102 and the cap 71 are slightly separated. The position of the head unit 100 at this time is referred to as a flushing position. The flushing position is between the cap position and the cap standby position.

Figure 4:
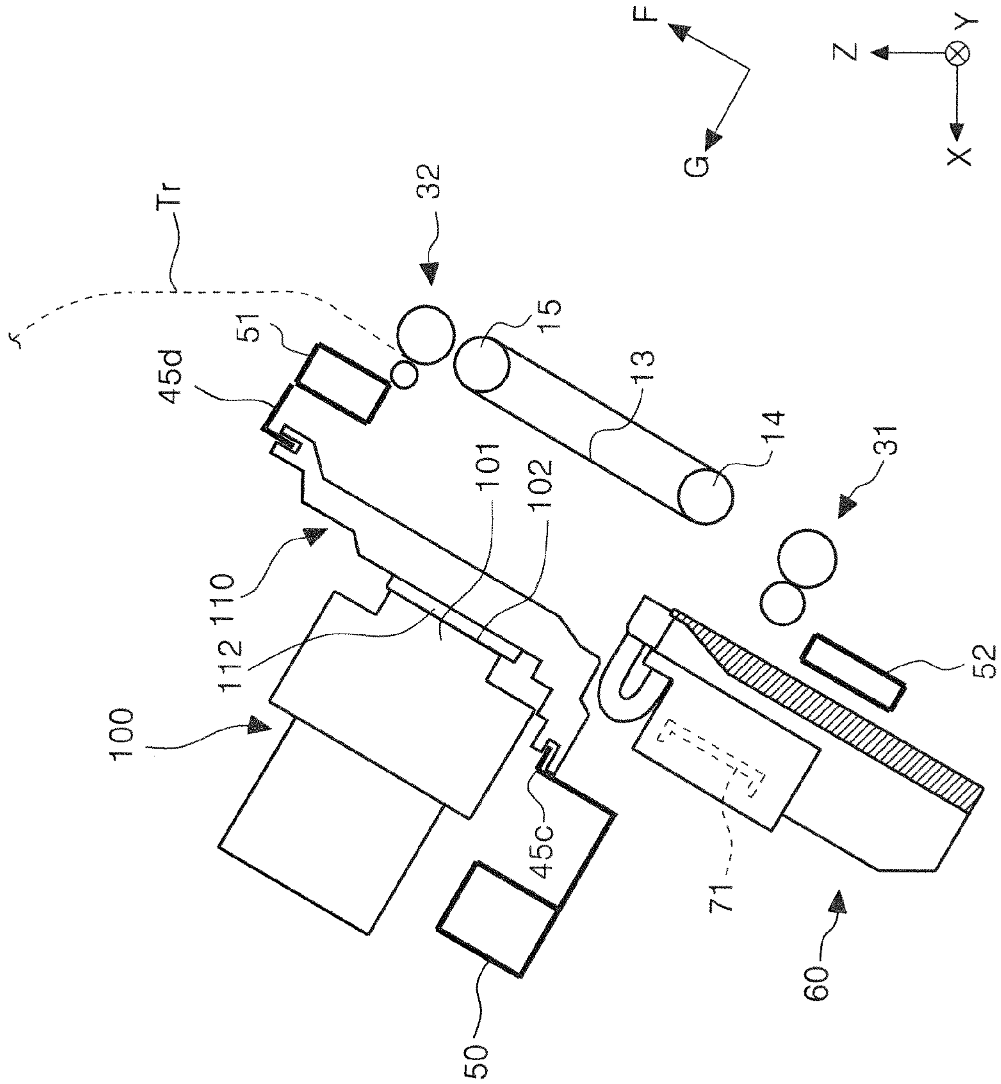
FIG. 4 is a diagram showing position of other units when the head unit is in a wiping position.

FIG. 4 shows the position of each unit when the ink ejection surface 102 is wiped with the wiper 112. Hereinafter, the position of the head unit 100 in this state is referred to as a wiping position. When the head unit 100 is at the wiping position, the cap carriage 60 is at a position retreated in the −F direction relative to the head unit 100 as shown in FIG. 2.

When the head unit 100 moves from the ink ejection position in FIG. 2 to the wiping position in FIG. 4, that is, when the ink ejection surface 102 is wiped, the head unit 100 moves from the ink ejection position in FIG. 2 to a position further in the +G direction than the wiping position in FIG. 4. The position of the head unit 100 at this time is referred to as a wiping standby position. In a state in which the head unit 100 is at the wiping standby position, the wiper carriage 110 moves from the home position in the +Y direction to the end position in the −Y direction. Then, the head unit 100 slightly moves in the −G direction to reach the wiping position shown in FIG. 4, and in this state, the wiper carriage 110 moves in the +Y direction, whereby the ink ejection surface 102 is wiped by the wiper 112.

The head unit 100 can further move in the +G direction from the wiping position. The head unit 100 can be replaced by moving the head unit 100 further in the +G direction from the wiping position. That is, the head unit 100 is movable between a replacement position furthest in the +G direction and the ink ejection position furthest in the −G direction.

Hereinafter, the cap carriage 60 will be further described with reference to FIG. 5 and subsequent drawings.

Figure 5:
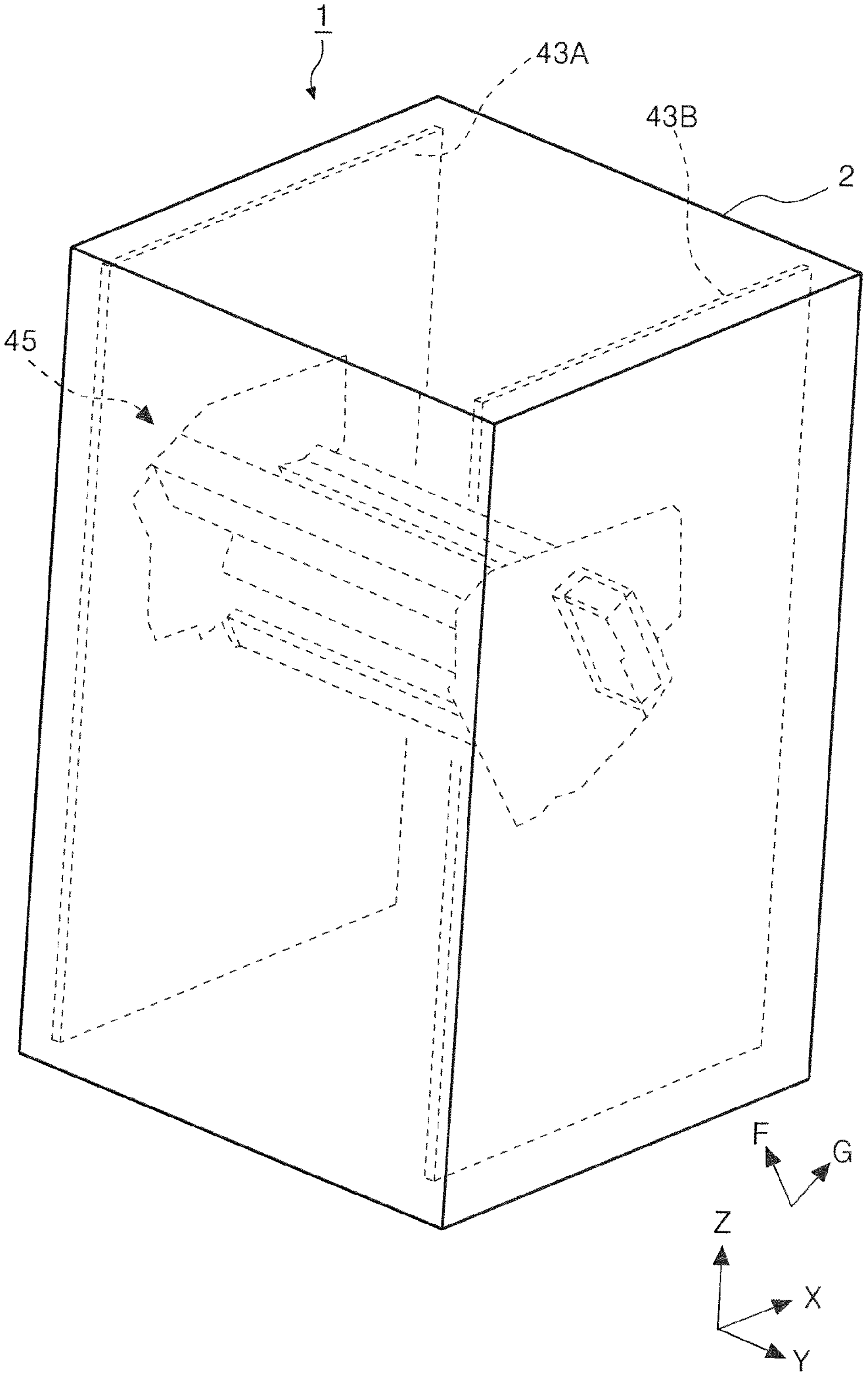
FIG. 5 is a perspective view of the printer viewed from a rear surface.

As shown in FIG. 5, the apparatus main body 2 includes a frame 43A at an end section in the −Y direction and a frame 43B at an end section in the +Y direction. A motion unit 45 is fixed to the frame 43A and the frame 43B. The motion unit 45 includes the head unit 100, the cap carriage 60, and the wiper carriage 110.

Figure 7:
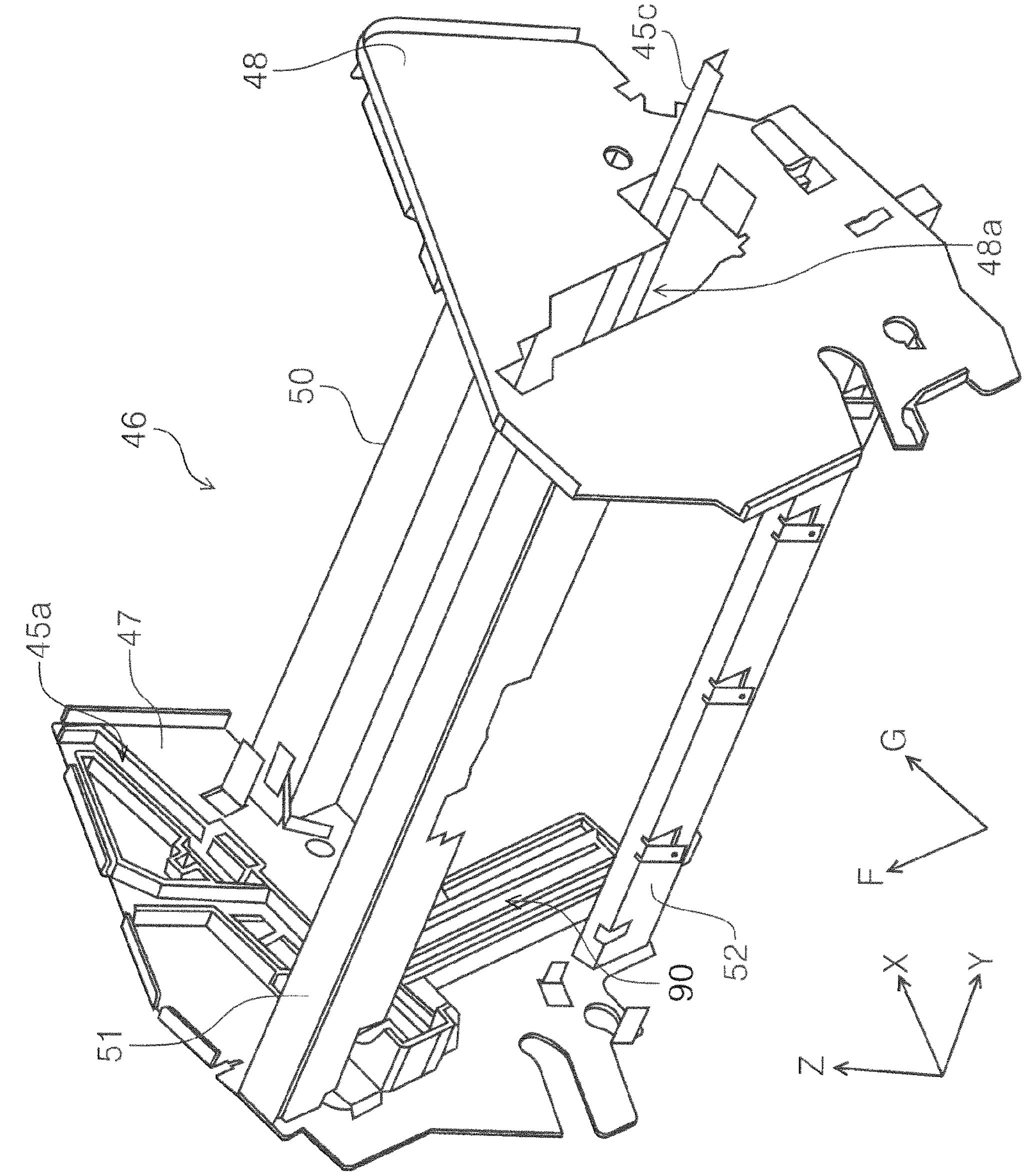
FIG. 7 is a perspective view of a frame assembly.

As shown in FIGS. 6 and 7, the motion unit 45 includes a front frame 47 and a rear frame 48 positioned in the +Y direction with respect to the front frame 47. The front frame 47 and the rear frame 48 form frame surfaces along an X-Z plane. The front frame 47 and the rear frame 48 are formed by a metal plate material.

The front frame 47 and the rear frame 48 are connected by a first connection frame 50, a second connection frame 51, and a third connection frame 52 that extend in the Y-axis direction. The first connection frame 50, the second connection frame 51, and the third connection frame 52 are formed by bending a metal plate material.

In this embodiment, the first connection frame 50, the second connection frame 51, and the third connection frame 52 are joined to the front frame 47 and the rear frame 48 by welding. The first connection frame 50, the second connection frame 51, and the third connection frame 52 are fixed to the front frame 47 and the rear frame 48, thereby configuring a frame assembly 46 as shown in FIG. 7. Hereinafter, for convenience, a space between the front frame 47 and the rear frame 48 may sometimes be referred to as an "inside", and the −Y direction with respect to the front frame 47 or the +Y direction with respect to the rear frame 48 may sometimes be referred to as an "outside".

As shown in FIGS. 2 to 4, the first connection frame 50, the second connection frame 51, and the third connection frame 52 are bent such that a part or the entirety of their cross section has a square shape, whereby the rigidity of the frame assembly 46, that is, the motion unit 45 as a whole is improved.

As shown in FIGS. 2 to 4, the first connection frame 50 extends in the −G direction from the portion forming the rectangle, then extends in the +F direction, and is bent so as to extend again in the −G direction, whereby a third guide section 45*c* is integrally formed. The third guide section 45*c* guides the wiper carriage 110 in the Y-axis direction. The second connection frame 51 is also provided with a fourth guide section 45*d* extending from the second connection frame 51 in the +G direction and then bent in the −F direction. The fourth guide section 45*d* is formed by bending a metal plate material similarly to the other frames, and guides the wiper carriage 110 in the Y-axis direction together with the third guide section 45*c*. In FIG. 7, the fourth guide section 45*d* is not shown.

As shown in FIG. 7, the third guide section 45*c* extends to the outside of the rear frame 48. That is, the main body section of the first connection frame 50 extends between the front frame 47 and the rear frame 48, and only the third guide section 45*c* extends to the outside of the rear frame 48. As a result, the wiper carriage 110 can move to the outside of the rear frame 48. As shown in FIG. 6, the fourth guide section 45*d* also extends to the outside of the rear frame 48 in the same way as the third guide section 45*c*.

Further, an opening section 48*a* is formed in the rear frame 48 as shown in FIGS. 6 and 7. The opening section 48*a* has a shape along an outer shape of the wiper carriage 110 as the wiper carriage 110 is viewed from the Y-axis direction, and is formed so as to be larger than the outer shape of the wiper carriage 110. By this, the wiper carriage 110 can move between the inside and the outside of the rear frame 48 through the opening section 48*a*.

Inside the front frame 47 and the rear frame 48, a head guide unit is provided along the G-axis direction. In FIGS. 6 and 7, the head guide unit provided on the front frame 47 is denoted by reference symbol 45*a*, and the head guide unit provided on the rear frame 48 is not visible. The head guide unit 45*a* guides the head unit 100 in the G-axis direction.

Further, inside the front frame 47 and the rear frame 48, a cap guide unit is provided along the F-axis direction. In FIG. 7, the cap guide unit provided on the front frame 47 is denoted by reference symbol 90, and the cap guide unit provided on the rear frame 48 is not visible. The cap guide unit 90 guides the cap carriage 60 in the F-axis direction.

The cap guide unit 90 will be described in detail later.

Next, the configuration of the cap carriage 60 will be described in detail.

Figure 8:
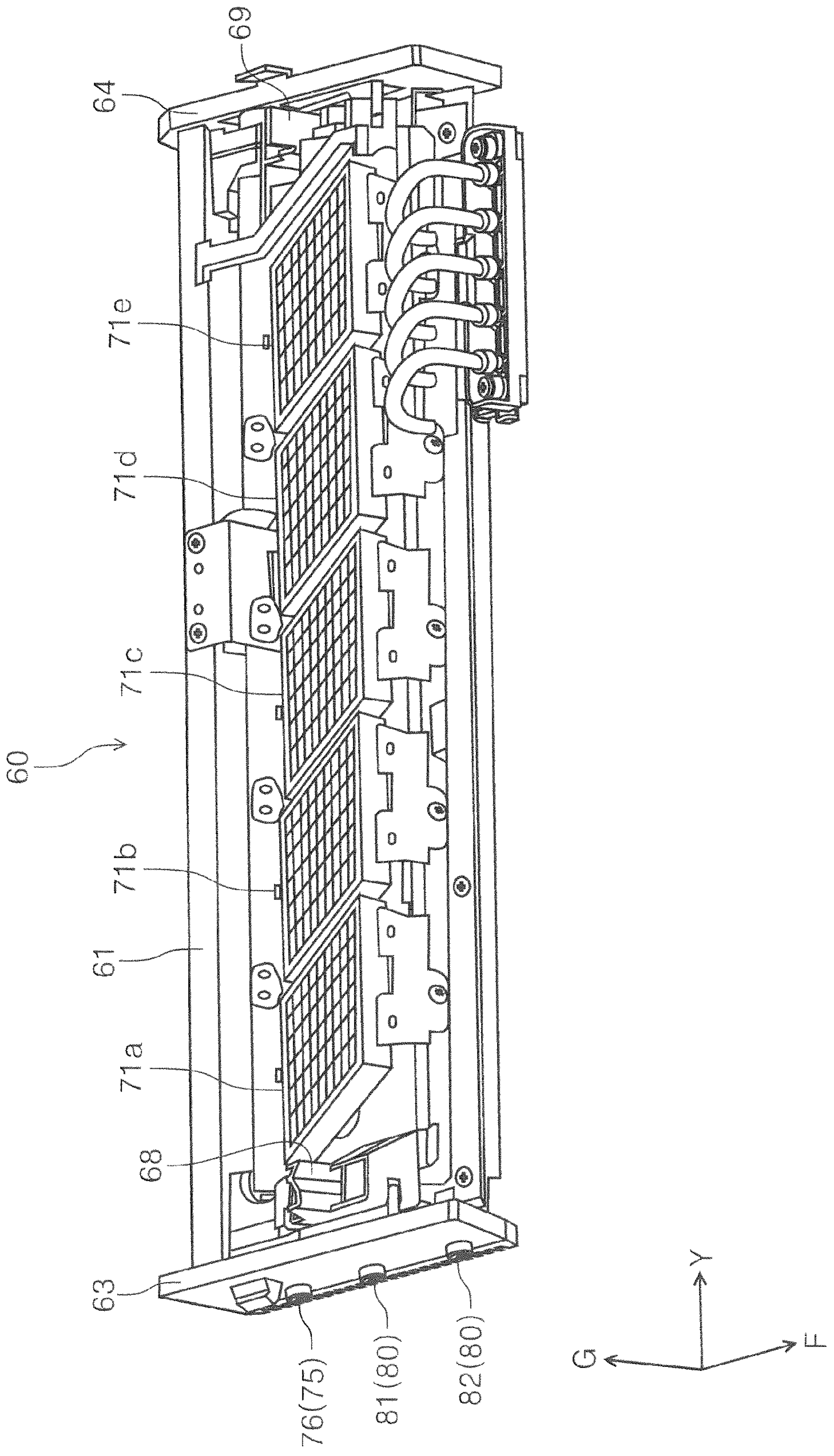
FIG. 8 is a perspective view of a cap carriage in a state in which a cap unit is mounted.

In FIG. 8, a base body of the cap carriage 60 is constituted by a main body section 61. The main body section 61 has a shape that opens in the +F direction and the +G direction, and caps 71*a*, 71*b*, 71*c*, 71*d*, and 71*e* are provided along the Y-axis direction with respect to the main body section 61. In the present specification, the plurality of caps are referred to as caps 71 when they are not particularly distinguished.

Figure 9:
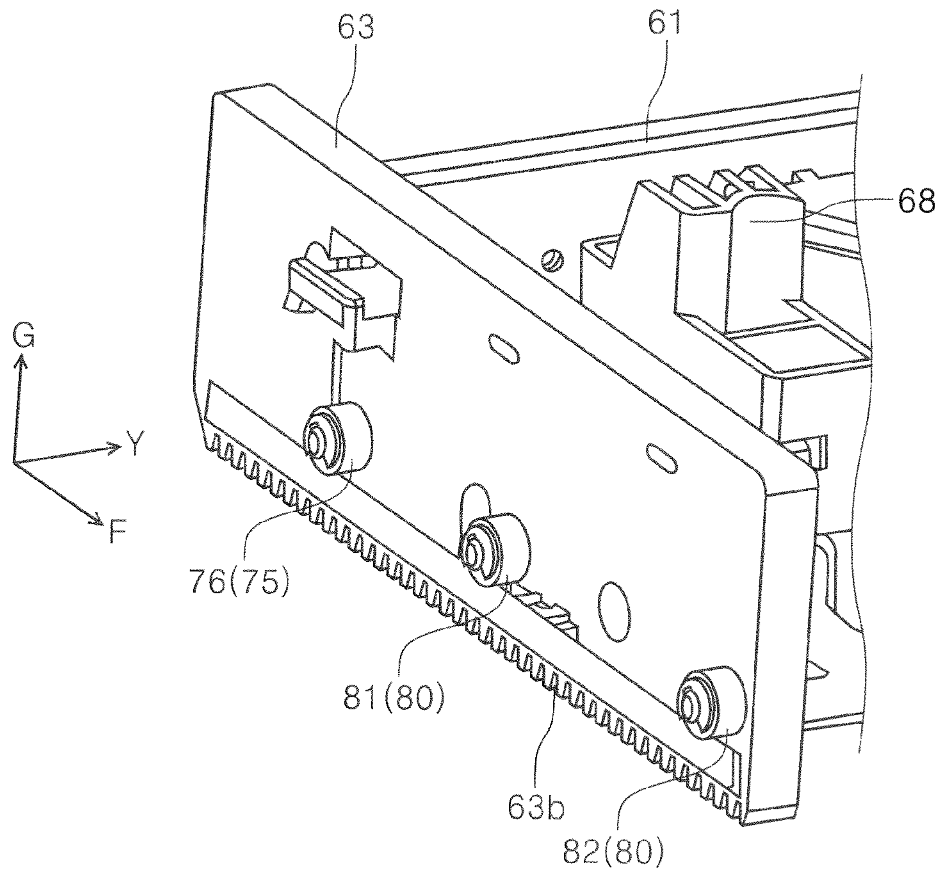
FIG. 9 is a perspective view of one side surface of the cap carriage.

A first side frame 63 is provided upright at an end portion in the −Y direction with respect to the main body section 61, and a second side frame 64 is provided upright at an end portion in the +Y direction. As shown in FIG. 9, the rack section 63*b* is formed along the F-axis direction on the surface in the −G direction, that is, on the bottom surface, of the first side frame 63. As described above, the rack section 63*b* meshes with the pinion 66A (see FIGS. 11 and 13) to constitute the rack-and-pinion mechanism.

Figure 10:
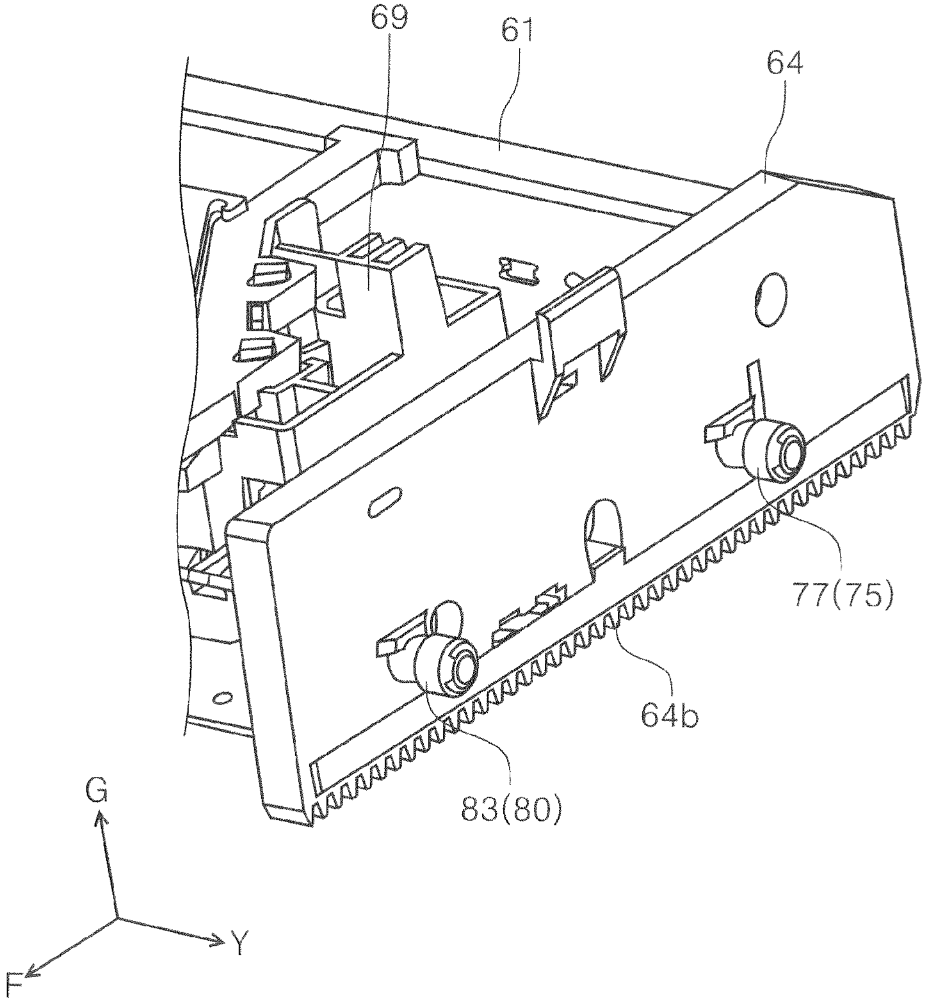
FIG. 10 is a perspective view of the other side surface of the cap carriage.

As shown in FIG. 10, the rack section 64*b* is formed along the F-axis direction on the surface in the −G direction, that is, the bottom surface, of the second side frame 64. As described above, the rack section 64*b* is meshed with the pinion 66B (see FIGS. 12 and 14) to constitute the rack-and-pinion mechanism.

As shown in FIG. 8, a first positioning section 68 is provided to the inside of the first side frame 63, and a second positioning section 69 is provided to the inside of the second side frame 64. The first positioning section 68 and the second positioning section 69 contact with contact pins (not shown) provided in the head unit 100, respectively, to restrict the position of the cap 71 with respect to the head unit 100. The engagement of the contact pins with the first positioning section 68 and the second positioning section 69 can be extricated by moving the head unit 100 to the replacement position.

Figure 11:
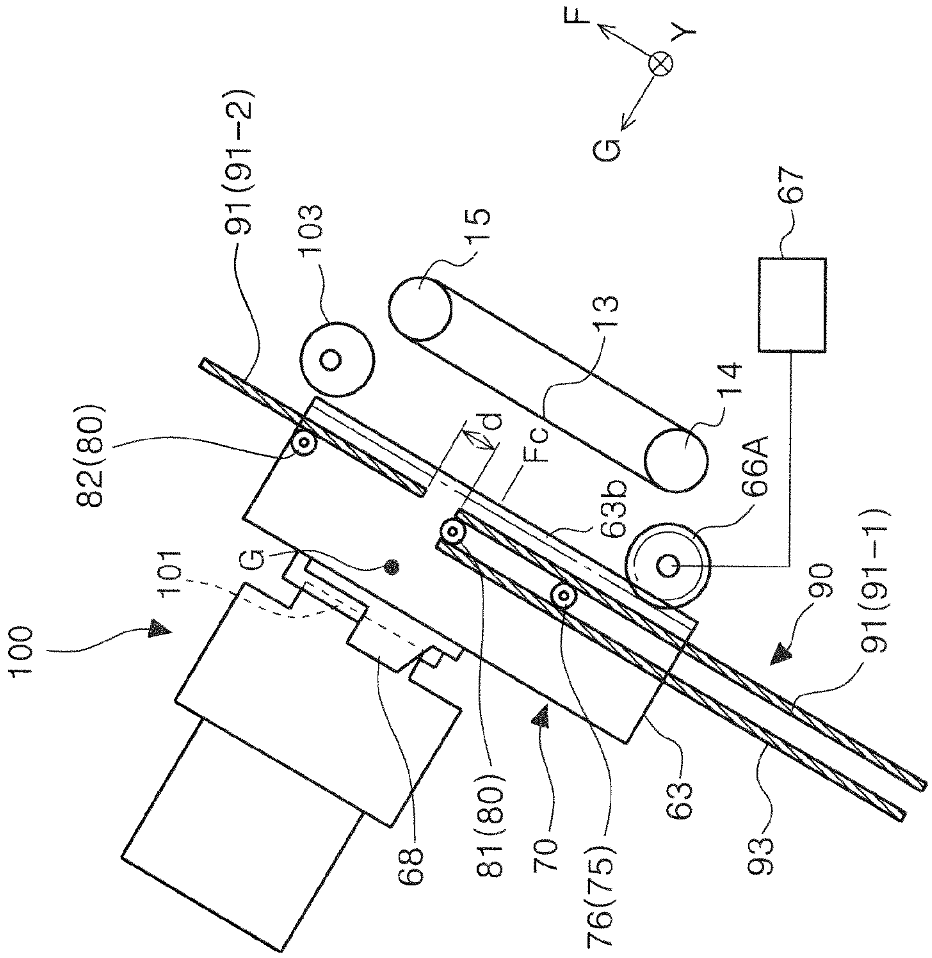
FIG. 11 is a side view of one side of the cap carriage when in the maintenance position.
Figure 12:
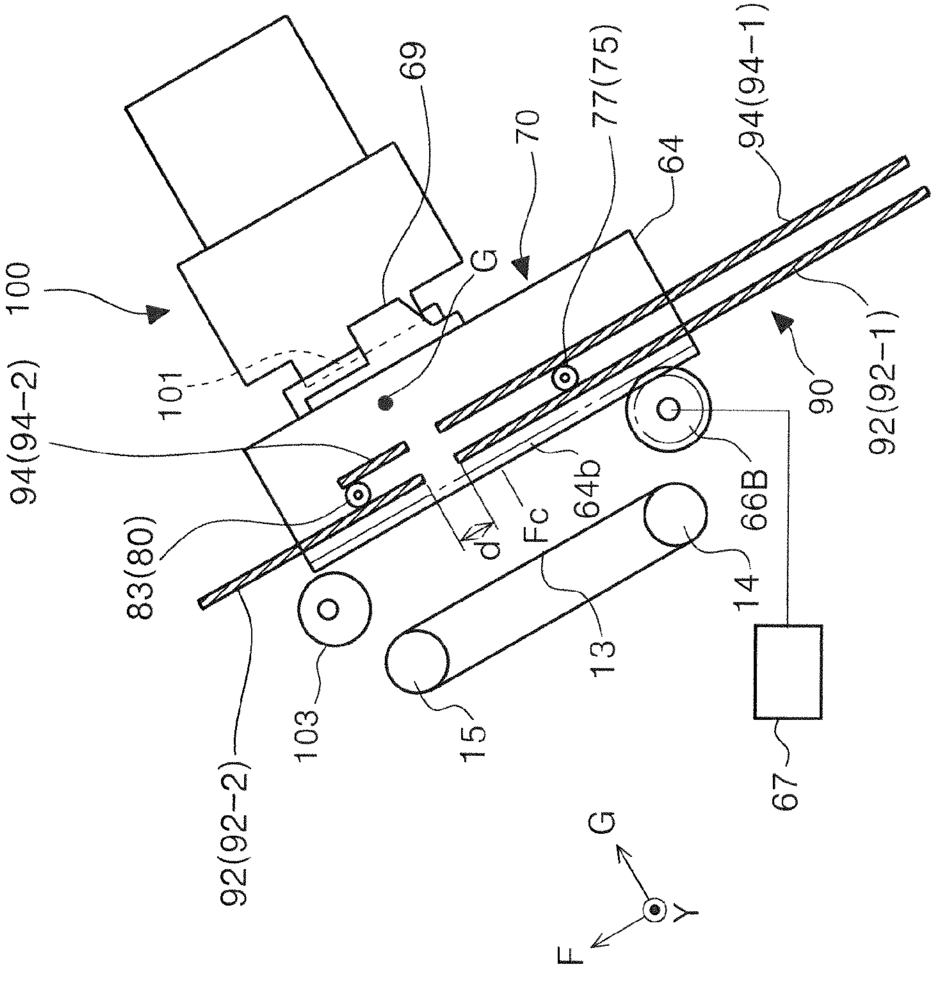
FIG. 12 is a side view of the other side of the cap carriage when in the maintenance position.

As shown in FIGS. 11 and 12, the first positioning section 68 and the second positioning section 69 are the portions of the cap carriage 60 that protrude furthest in the +G direction.

As shown in FIGS. 9 and 10, a first guided section 75 and a second guided section 80 are provided on the −Y direction side surface of the first side frame 63 and a +Y direction side surface of the second side frame 64. The first guided section 75 and the second guided section 80 are portions that are guided in the F-axis direction by the cap guide unit 90 described with reference to FIG. 7.

As described above, the first guided section 75 and the second guided section 80 are provided, with respect to the Y-axis direction, which is an intersecting direction that intersects the F-axis direction, on the side surface of the cap carriage 60 in the first direction, that is, the −Y direction, and the side surface of the cap carriage 60 in the second direction, that is, the +Y direction. Accordingly, the cap carriage 60 can stably move along the F-axis direction.

The second guided section 80 may be provided only on one of the side surface in the −Y direction or the side surface in the +Y direction of the cap carriage 60.

In the present embodiment, the first guided section 75 includes a first contact section 76 provided on the first side frame 63 and a second contact section 77 provided on the second side frame 64.

In the present embodiment, the second guided section 80 includes a third contact section 81 and a fourth contact section 82 provided on the first side frame 63 and a fifth contact section 83 provided on the second side frame 64.

The contact sections which are the first contact section 76, the second contact section 77, the third contact section 81, the fourth contact section 82, and the fifth contact section 83 are portions that contact the cap guide unit 90 (to be described later) and in the present embodiment are composed by driven rollers that can be driven to rotate. The rotation axis center line of the driven roller is parallel to the Y-axis direction. However, the contact sections are not limited to driven rollers and may be configured as a portion that does not rotate.

Figure 15:
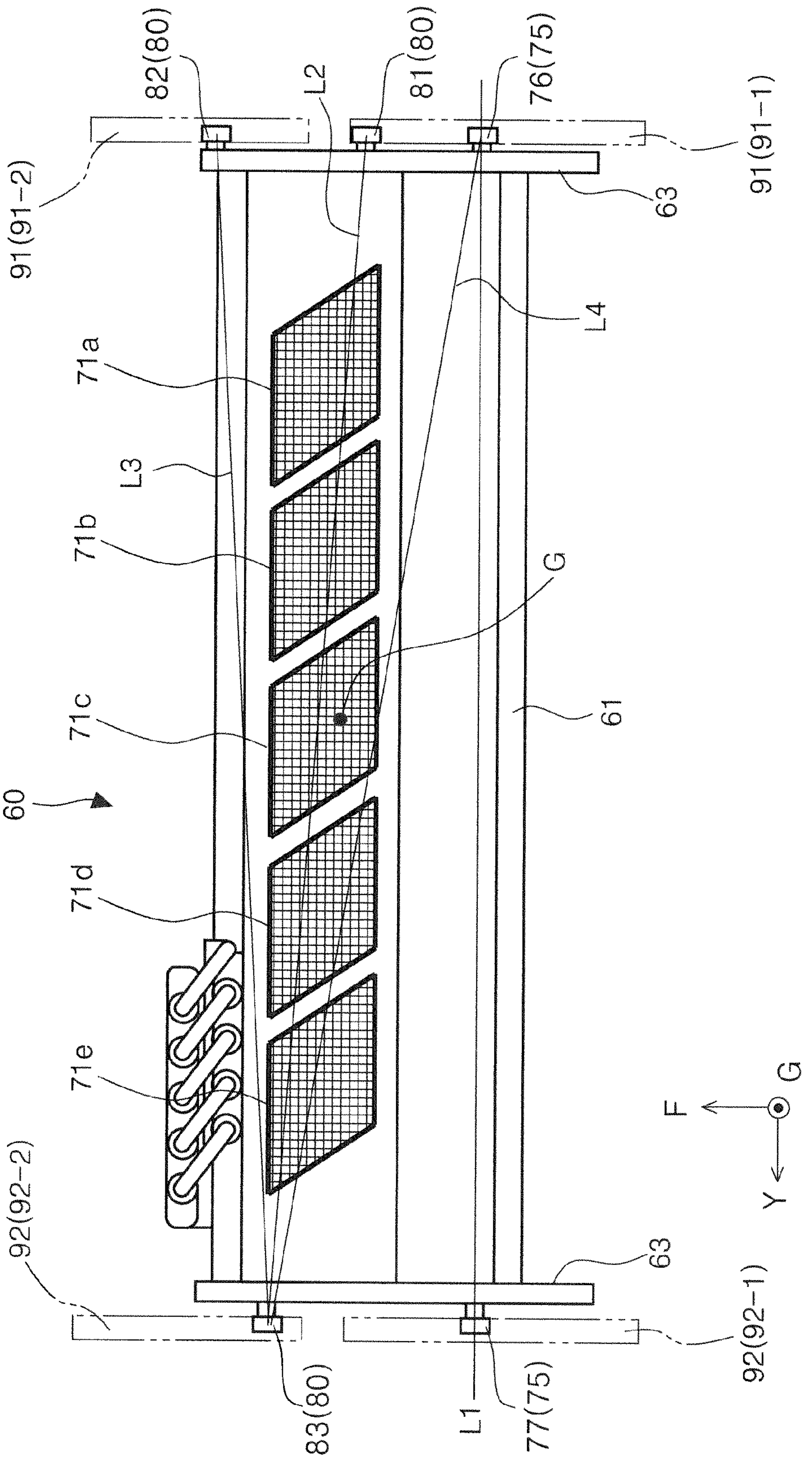
FIG. 15 is a plan view of the cap carriage.

As shown in FIG. 15, the first contact section 76 and the second contact section 77 constituting the first guided section 75 are provided so that their positions in the F-axis direction coincide with each other. In other words, the first contact section 76 and the second contact section 77 are located at positions overlapping as viewed in the Y-axis direction. Line L1 is a line parallel to the Y-axis direction and passes through the first contact section 76 and the second contact section 77.

On the other hand, the third contact section 81, the fourth contact section 82, and the fifth contact section 83 are provided so that their positions in the F-axis direction do not coincide with each other. In other words, the third contact section 81, the fourth contact section 82, and the fifth contact section 83 are positioned so as not to overlap as viewed in the Y-axis direction.

Next, the cap guide unit 90 for guiding the first guided section 75 and the second guided section 80 in the F-axis direction will be described in detail.

The cap guide unit 90 includes a lower guide section that supports the first guided section 75 and the second guided section 80 at least between the retreat position and the maintenance position in the movement path Rt of the cap carriage 60, and an upper guide section that is located above the lower guide section.

Figure 13:
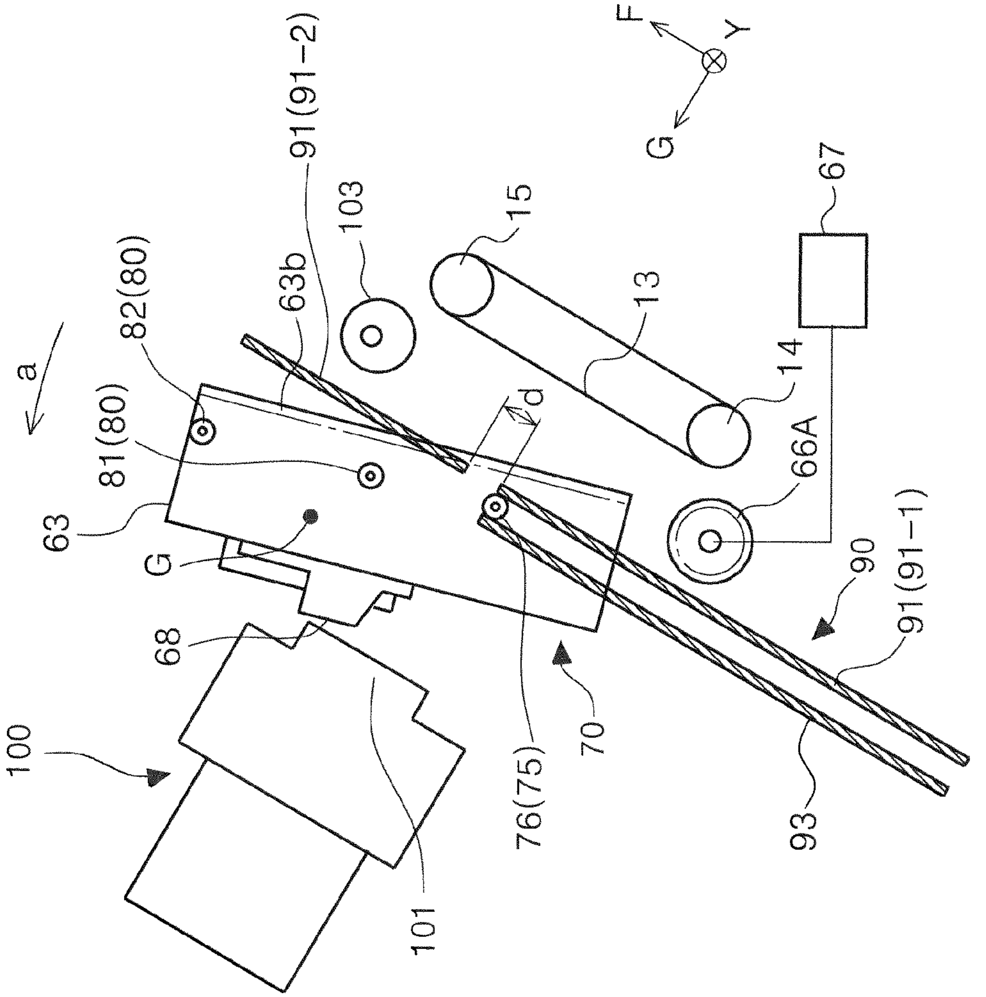
FIG. 13 is a side view of one side of the cap carriage moving in a first movement direction from the maintenance position and in the process of pivoting.
Figure 14:
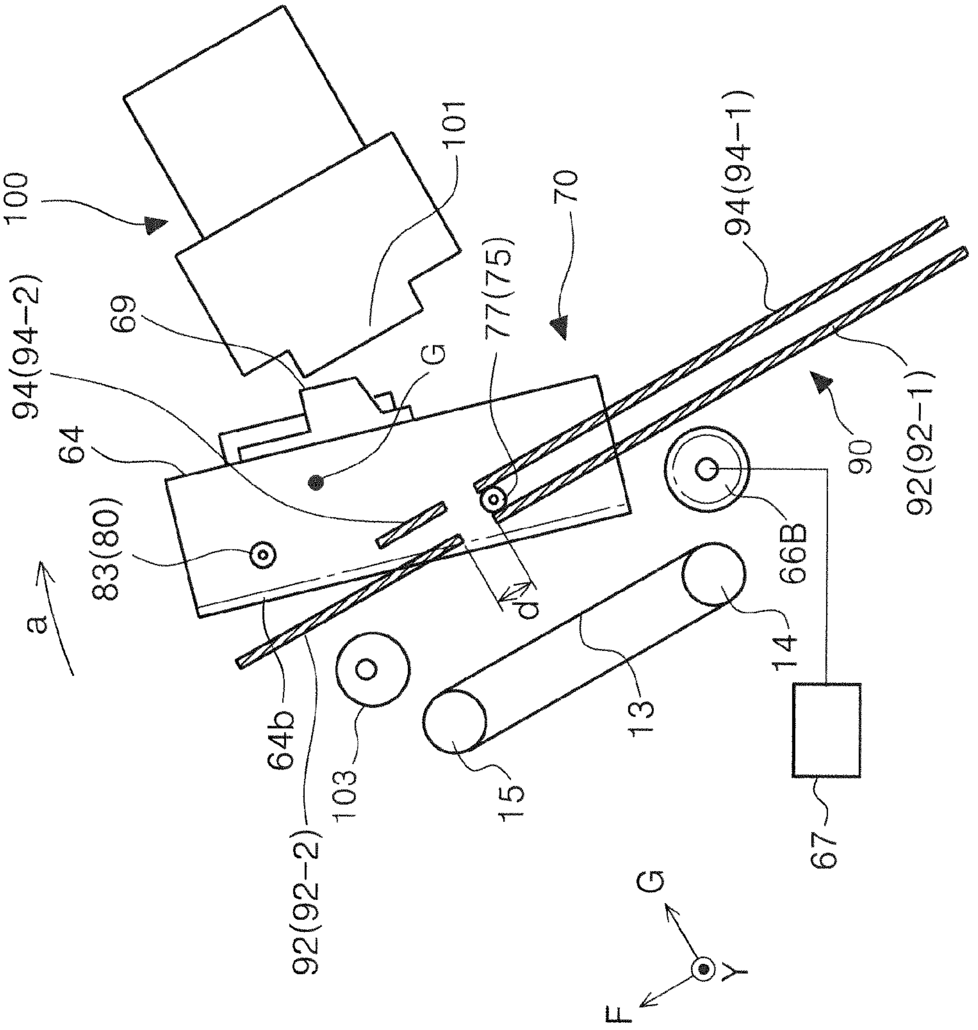
FIG. 14 is a side view of the other side of the cap carriage moving in the first movement direction from the maintenance position and process of pivoting.

The lower guide section includes a front lower guide section 91, which, as shown in FIGS. 11 and 13, is located in the −Y direction (apparatus front side) with respect to the cap carriage 60 and a rear lower guide section 92, which, as shown in FIGS. 12 and 14, is located in the +Y direction (apparatus rear side) with respect to the cap carriage 60.

As shown in FIGS. 11 and 13, the front lower guide section 91 is constituted by a front first lower guide section 91-1 and a front second lower guide section 91-2 positioned at a distance d in the +F direction with respect to the front first lower guide section 91-1. Similarly, as shown in FIGS. 12 and 14, the rear lower guide section 92 is constituted a rear first lower guide section 92-1 and a rear second lower guide section 92-2 positioned at the distance d in the +F direction with respect to the rear first lower guide section 92-1. The distance d is set in order for the head guide unit 45*a* (see FIG. 7) to cross the cap guide unit 90.

In the present embodiment, the front first lower guide section 91-1 and the front second lower guide section 91-2 are completely separated to form the distance d, but a recess or a hole may be formed in a support surface that supports the first guided section 75 and the second guided section 80 while the front first lower guide section 91-1 and the front second lower guide section 91-2 are connected. The relationship between the rear first lower guide section 92-1 and the rear second lower guide section 92-2 is the same.

The upper guide section includes a front upper guide section 93, which, as shown in FIGS. 11 and 13, is located in the −Y direction (apparatus front side) with respect to the cap carriage 60 and a rear upper guide section 94, which, as shown in FIGS. 12 and 14, is located in the +Y direction (apparatus rear side) with respect to the cap carriage 60. The rear upper guide section 94 is constituted by a rear first upper guide section 94-1 and a rear second upper guide section 94-2 positioned at the distance d in the +F direction with respect to the rear first upper guide section 94-1.

As shown in FIGS. 11 and 13, the first guided section 75 and the second guided section 80 provided on the −Y direction side surface with respect to the cap carriage 60 are supported by the front lower guide section 91, and are guided in the F-axis direction in a state of being sandwiched between the front lower guide section 91 and the front upper guide section 93 in the region where the front upper guide section 93 is arranged.

Similarly, as shown in FIGS. 12 and 14, the first guided section 75 and the second guided section 80 provided on the +Y direction side surface with respect to the cap carriage 60 are supported by the rear lower guide section 92, and are guided in a state of being sandwiched between the rear lower guide section 92 and the rear upper guide section 94 in the region where the rear upper guide section 94 is arranged.

As described above, the first guided section 75 and the second guided section 80 are provided on the +Y direction side portion and the −Y direction side portion of the cap carriage 60 in the Y-axis direction, which intersects the movement direction of the cap carriage 60. The cap guide unit 90 is also provided in the −Y direction and the +Y direction with respect to the cap carriage 60 in the Y-axis direction. With such a configuration, the cap carriage 60 can stably move along the movement path Rt.

In the present embodiment, the first guided section 75 and the second guided section 80 are provided on the side surfaces of the cap carriage 60 in the Y-axis direction, but may be, for example, provided so as to protrude in the Y-axis direction from the bottom surface (surface in the −G direction) of the cap carriage 60. That is, the first guided section 75 and the second guided section 80 need only be provided on both sides of the cap carriage 60 in the Y-axis direction.

FIGS. 11 and 12 show a state in which the cap carriage 60 is at the maintenance position (corresponding to FIG. 3). In this state, as shown in FIG. 11, the first contact section 76 constituting the first guided section 75 and the third contact section 81 constituting the second guided section 80 are sandwiched between the front first lower guide section 91-1 and the front upper guide section 93. The fourth contact section 82 constituting the second guided section 80 shifts from the front upper guide section 93 in the +F direction and is supported by the front second lower guide section 91-2.

Further, as shown in FIG. 12, the second contact section 77 constituting the first guided section 75 and the fifth contact section 83 constituting the second guided section 80 are sandwiched between the rear lower guide section 92 and the rear upper guide section 94.

As described above, in a state in which the cap carriage 60 is at the maintenance position, the cap carriage 60 as viewed in the Y-axis direction is in a state in which it is not able to rotate.

When the cap carriage 60 moves in the +F direction after the head unit 100 moves toward the replacement position in the +G direction from this state, the third contact section 81 shifts from the front upper guide section 93 in the +F direction as is clear from FIG. 11, and the fifth contact section 83 shifts from the rear upper guide section 94 (the rear second upper guide section 94-2) in the +F direction as is clear from FIG. 12. As a result, the cap carriage 60 can pivot in the direction of the arrow a shown in FIGS. 13 and 14 around the first guided section 75, that is, the first contact section 76 and the second contact section 77 as pivot axes. The pivot of the cap carriage 60 in the direction of the arrow a is a pivot accompanied by the separation of the second guided section 80 from the cap guide unit 90.

When the cap carriage 60 is further moved in the +F direction while the cap carriage 60 pivots in the arrow a direction, the first contact section 76 shifts from the front upper guide section 93 in the +F direction as is clear from FIG. 13, and the second contact section 77 shifts from the rear upper guide section 94 (rear second upper guide section 94-2) in the +F direction as is clear from FIG. 14. Thus, the cap carriage 60 can be pulled out upward.

When the cap carriage 60 is mounted, it can be mounted in the reverse order of the pulled out as described above.

As described above, the cap carriage 60 includes the first guided section 75, which is guided by the cap guide unit 90, and the second guided section 80. The second guided section 80 is positioned in the +F direction, which is the direction from the retreat position toward the maintenance position with respect to the first guided section 75, and is guided by the cap guide unit 90.

The cap guide unit 90 is configured so that when the cap carriage 60 moves from the maintenance position in the +F direction, the cap guide unit 90 allows pivot accompanied by separation of the second guided section 80 from the cap guide unit 90, which is pivot of the cap carriage 60 with the first guided section 75 as the pivot axis. The first guided section 75 can be separated from the cap guide unit 90, by moving in the +F direction after the pivot of the cap carriage 60 is allowed.

That is, compared to a configuration in which the first guided section 75 and the second guided section 80 separate from the cap guide unit 90 by moving the cap carriage 60 straight in the +F direction, it is possible to suppress a space necessary for removing the cap carriage 60, and to suppress an increase in size of the apparatus.

Further, when the cap carriage 60 moves from the maintenance position in the +F direction, the second guided section 80 is released from restriction by the front upper guide section 93 and the rear upper guide section 94. As a result, since pivot of the cap carriage 60, which involves upward movement of the second guided section 80, is allowed, the cap carriage 60 can be pivoted upward, that is, the cap carriage 60 can be removed from upper side, so that workability when the cap carriage 60 is removed becomes easy.

In addition, since the first contact section 76 and the second contact section 77 are at overlapping positions as viewed from the Y-axis direction, the cap carriage 60 can stably pivot around the first contact section 76 and the second contact section 77. In addition, it is possible to suppress a space required for pivot of the first contact section 76 and the second contact section 77, and to suppress an increase in size.

Further, since the third contact section 81, the fourth contact section 82, and the fifth contact section 83 constituting the second guided section 80 are located at positions that do not overlap as viewed from the Y-axis direction, that is, because they are arranged at positions shifted along the F-axis direction, they are supported by the cap guide unit 90 over a wide range along the F-axis direction. Accordingly, even when the cap carriage 60 receives an external force from the head unit 100, the posture of the cap carriage 60 can be stably maintained.

Although the second guided section 80 is constituted by three contact sections in this embodiment, it may be constituted by two contact sections or by four or more contact sections. When the second guided section 80 is composed of two contact sections, the contact section of the side surface in the −Y direction and the contact section of the side surface in the +Y direction may or may not overlap each other as viewed in the Y-axis direction.

When the second guided section 80 is composed of three or more contact sections, a plurality of contact sections may be provided on one of or both of the side surface in the −Y direction and the side surface in the +Y direction.

Further, the front lower guide section 91 is constituted by the front first lower guide section 91-1 and the front second lower guide section 91-2, which is positioned at the distance d in the +F direction with respect to the front first lower guide section 91-1. Further, the rear lower guide section 92 is constituted by the rear first lower guide section 92-1 and the rear second lower guide section 92-2, which is positioned at the distance d in the +F direction with respect to the rear first lower guide section 92-1. By this, although the second guided section 80 might enter through the distance d, since the contact sections constituting the second guided section 80 are disposed in a state of being shifted in position along the F-axis direction, it is possible to prevent the second guided section 80 entering through the distance d.

In addition, since the distance d is provided, the distance d can be used as a passage region of other components, and in the present embodiment, the distance d can be used as a passage region of a part of the head unit 100, and thus the degree of freedom of design is improved.

The cap carriage 60 also includes the cap 71 and the main body section 61, which supports the cap 71 and which includes the first guided section 75 and the second guided section 80. As shown in FIG. 15, the cap 71 overlaps with the line L2, which, as viewed in the G-axis direction that is the normal direction to the ink ejection surface 102, connects the third contact section 81 constituting the second guided section 80 provided on the −Y direction side surface and the fifth contact section 83 constituting the second guided section 80 provided on the +Y direction side surface.

Accordingly, when the cap 71 receives the pressing force in the −G direction from the ink ejection surface 102, the pressing force can be appropriately received by the plurality of contact sections constituting the second guided section 80, and the posture of the cap 71 is stabilized.

In the present embodiment, the cap 71 is an example of the pressed section to be pressed which receives the pressing force from the ink ejection surface 102 of the line head 101, but the pressed section to be pressed which receives the pressing force from the ink ejection surface 102 includes, for example, the wiper 112. That is, the configuration of the cap carriage 60 can be applied to the wiper carriage 110.

In FIG. 15, a line L3 is a line connecting the fourth contact section 82 and the fifth contact section 83. The cap 71 may overlap with the line L3 instead of the line L2, or may overlap with both the line L2 and the line L3. Part or all of the cap 71 may be included in a triangular region formed by the line L2 and the line L3.

When the third contact section 81 is not provided, a line L4 connecting the fifth contact section 83 and the first contact section 76 may overlap with the cap 71. Part or all of the cap 71 may be included in a triangular region formed by the line L3 and the line L4.

In the present embodiment, the movement path Rt of the cap carriage 60 includes a vertically upward component from the retreat position toward the maintenance position, and the centroid position G of the cap carriage 60 in the movement direction of the cap carriage 60 is toward the +F direction in the cap carriage 60 as shown in FIGS. 11 and 12. Being "toward the +F direction" means being positioned in the +F direction with respect to the center position Fc of the cap carriage 60 in the F axis direction.

With such a configuration, when the cap carriage 60 is taken out from upper side, the heavy side is lifted first, and the cap carriage 60 is easily taken out compared to the opposite case.

The movement path Rt of the cap carriage 60 may be along the horizontal direction.

The first positioning section 68 and the second positioning section 69, which are portions of the cap carriage 60 that protrude furthest in the +G direction, are also located toward the +F direction in the cap carriage 60. As a result, an area in the apparatus necessary for taking out the cap carriage 60 can be suppressed. Further, the cap carriage 60 can be rotated at an early stage when the cap carriage 60 is taken out, and this can also suppress a space necessary for removing the cap carriage 60, and to suppress an increase in size of the apparatus.

Further, the medium transport path toward the discharge positions A1 and A2 described with reference to FIG. 1 is curved upward on the downstream side of the line head 101. In FIG. 3, reference symbol Tr denotes a medium transport path curved upward, and the medium transport path Tr intersects with the movement path Rt in a case where the movement path Rt of the cap carriage 60 is extended in the +F direction.

In such a configuration, when the cap carriage 60 is taken out, there is a concern that interference between the cap carriage 60 and the medium transport path Tr may occur, but since the cap carriage 60 can be taken out while pivoting as described above, it is possible to avoid interference between the cap carriage 60 and the medium transport path Tr.

Figure 16:
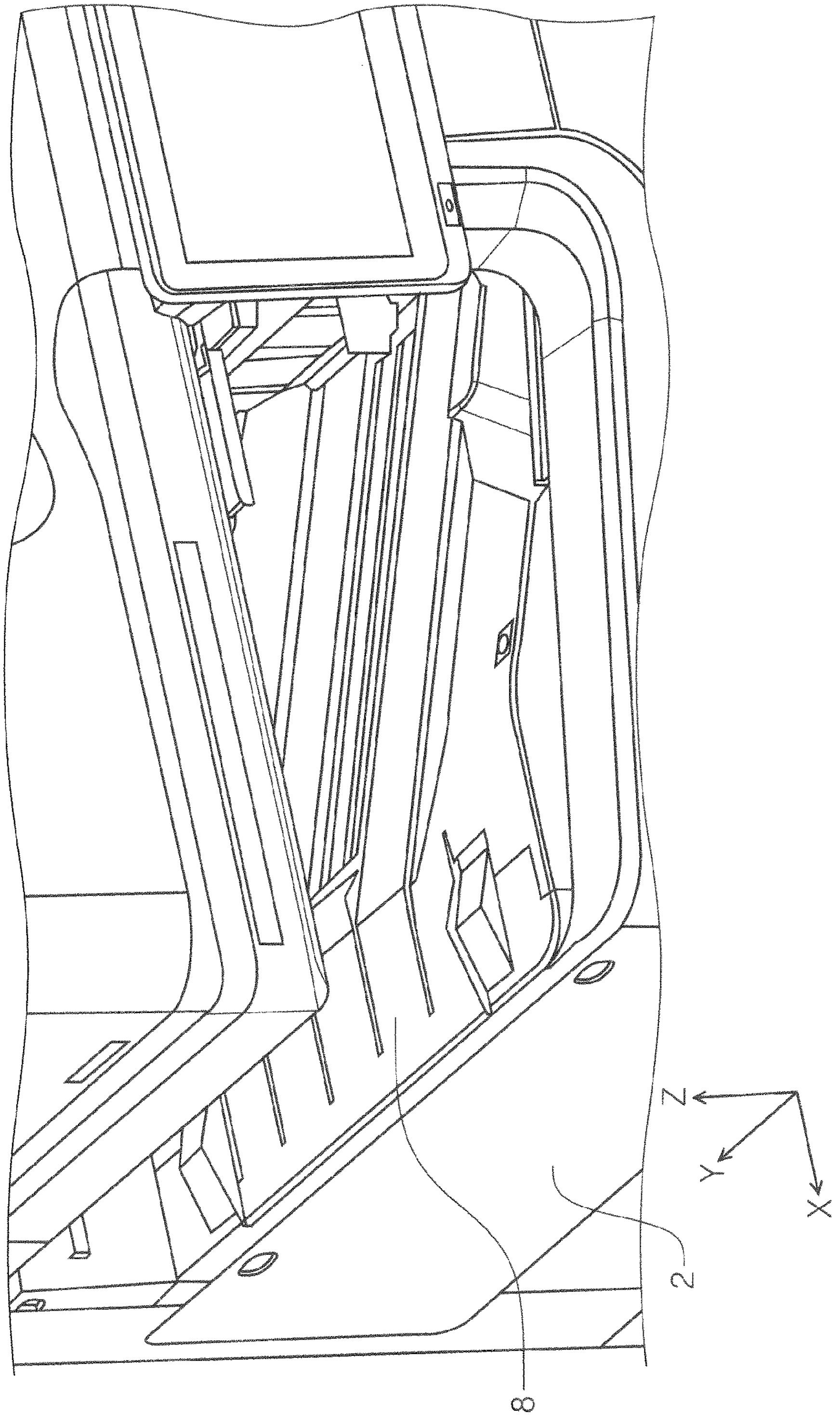
FIG. 16 is a perspective view of a discharge tray mounting section in an apparatus main body, and is a perspective view of a state in which the discharge tray is mounted.
Figure 17:
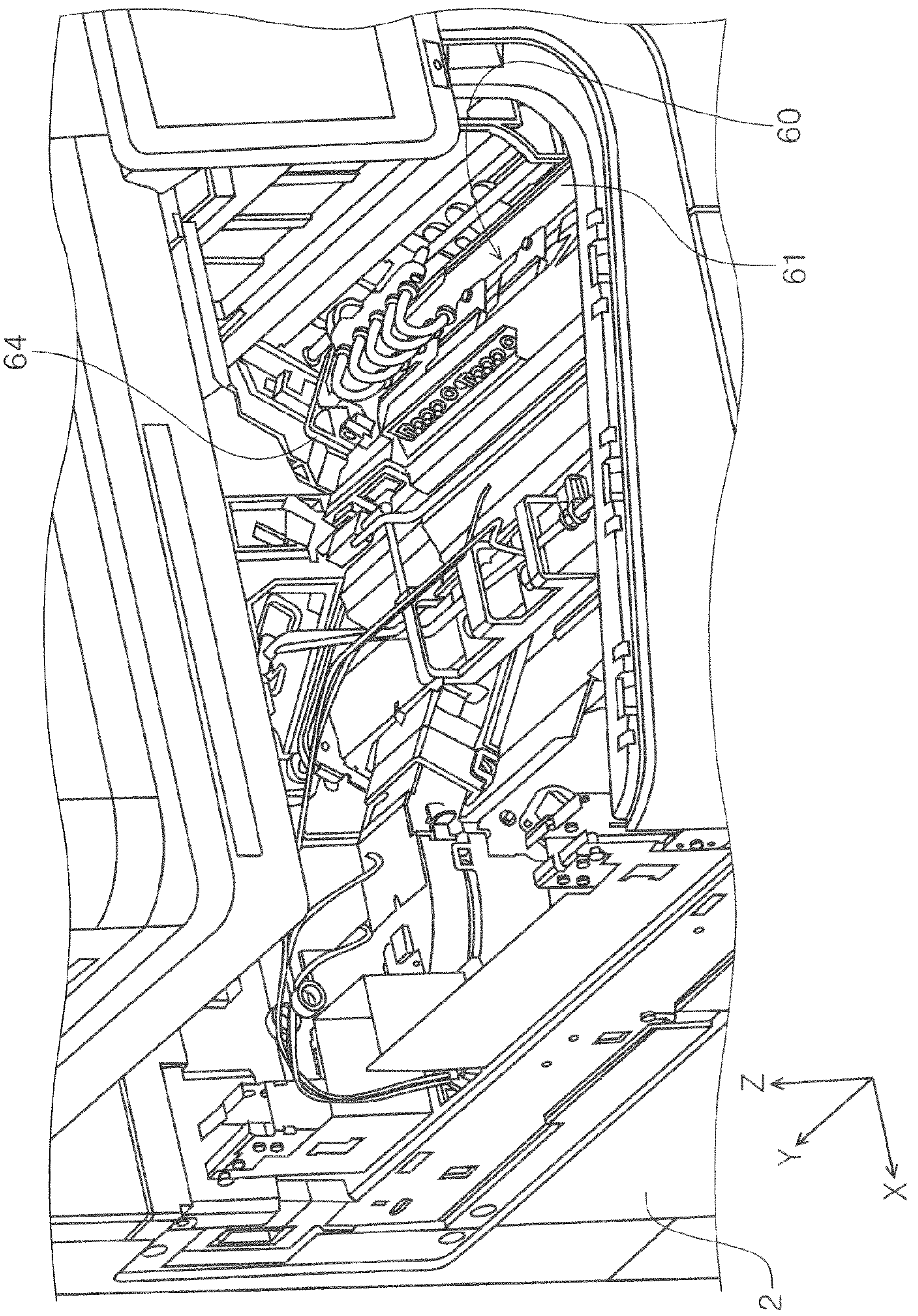
FIG. 17 is a perspective view of the discharge tray mounting section in the apparatus main body, and is a perspective view of a state in which the discharge tray is removed.

As described with reference to FIG. 1, the discharge tray 8 is provided vertically above the head unit 100 as a medium receiving section for receiving the medium that was recorded on and discharged. As shown in FIGS. 16 and 17, the discharge tray 8 is detachable and attachable with respect to the apparatus main body 2, and in the present embodiment, the entire discharge tray 8 is detachable and attachable with respect to the apparatus main body 2. By detaching the discharge tray 8 from the apparatus main body 2, the cap carriage 60 is exposed and can be removed.

With such a configuration, an opening for taking out the cap carriage 60 to the outside of the apparatus can be ensured, and the cap carriage 60 can be easily taken out and attached.

In this embodiment, the discharge tray 8 is detachable and attachable with respect to the apparatus main body 2, but may be openable and closable with respect to the apparatus main body 2. Further, in the present embodiment, the entire discharge tray 8 is detachable and attachable with respect to the apparatus main body 2, but a part of the discharge tray 8 may be detachable and attachable with respect to the apparatus main body 2, or a part of the discharge tray 8 may be openable and closable with respect to the apparatus main body 2.

Further, in the present embodiment, as clear from FIGS. 13 and 14, the cap carriage 60 can move and pivot in a direction in which the second guided section 80 separates from the transport belt 13. Accordingly, it is possible to reduce a possibility that the cap carriage 60 collides with the transport belt 13 and damages the transport belt 13 when the cap carriage 60 is taken out.

In FIGS. 11 to 14, reference symbol 103 denotes a position adjustment cam as a position restricting member that restricts the ink ejection position of the head unit 100. The ink ejection position is restricted by the head unit 100 contacting with the position adjustment cam 103. The position adjustment cam 103 is an eccentric cam and can finely adjust the ink ejection position of the head unit 100 by rotating.

Then, the cap carriage 60 moves and pivots in a direction in which the second guided section 80 separates from the position adjustment cam 103. With such a configuration, it is possible to reduce the possibility that the cap carriage 60 collides with the position adjustment cam 103 and damages the position adjustment cam 103 when the cap carriage 60 is taken out.

The present disclosure is not limited to the embodiments described above, and various modifications are possible within the scope of the disclosure described in the claims, and it goes without saying that such modifications are also included within the scope of the present disclosure.

What is claimed is:

1. A recording apparatus comprising:

a recording section configured to record by ejecting liquid onto a medium;

a maintenance section configured to move along a movement path, the movement path including a maintenance position at which maintenance of the recording section is performed and a retreat position retreated from the maintenance position; and a guide unit configured to guide the maintenance section along the movement path, wherein the maintenance section is configured to be removable from the guide unit, the maintenance section includes a first guided section which is guided by the guide unit and a second guided section which is guided by the guide unit, the second guided section being positioned in a first movement direction with respect to the first guided section, the first movement direction being a direction from the retreat position toward the maintenance position, when the maintenance section moves from the maintenance position in the first movement direction, the guide unit allows pivoting of the maintenance section with the first guided section as a pivot axis, the pivoting being accompanied by separation of the second guided section from the guide unit, and the first guided section is configured to separate from the guide unit, by moving in the first movement direction after the pivot of the maintenance section is allowed.

2. The recording apparatus according to claim 1, wherein the guide unit includes a lower guide section configured to support the first guided section and the second guided section at least between the retreat position and the maintenance position in the movement path, and an upper guide section that is located above the lower guide section and when the maintenance section moves from the maintenance position in the first movement direction, the second guided section is released from restriction by the upper guide section, and pivot of the maintenance section, which accompanies the upward movement of the second guided section, is allowed.

3. The recording apparatus according to claim 2, wherein the first guided section is provided, with respect to an intersecting direction intersecting with a movement direction of the maintenance section, on a side section of the maintenance section that is the side section in a first direction which is one direction of the intersecting direction and on a side section of the maintenance section that is the side section in a second direction which is the other direction of the intersecting direction, the second guided section is provided on the side section in the first direction and on the side section in the second direction with respect to the intersecting direction, and the guide unit is provided in the first direction and in the second direction of the intersecting direction with respect to the maintenance section.

4. The recording apparatus according to claim 3, wherein the first guided section provided on the side section in the first direction includes a first contact section that contacts the guide unit, the first guided section provided on the side section in the second direction includes a second contact section that contacts the guide unit, and the first contact section and the second contact section are at an overlapping position as viewed from the intersecting direction.

5. The recording apparatus according to claim 3, wherein the second guided section provided on the side section in the first direction and the second guided section provided on the side section in the second direction include at least one contact section that contacts the guide unit, at least one of the second guided section provided on the side section in the first direction and the second guided section provided on the side section in the second direction includes a plurality of the contact sections, and the contact section constituting the second guided section provided on the side section in the first direction and the contact section constituting the second guided section provided on the side section in the second direction do not overlap each other as viewed from the intersecting direction.

6. The recording apparatus according to claim 5, wherein the lower guide section includes a first lower guide section and a second lower guide section spaced apart from the first lower guide section in the first movement direction and in a state in which the maintenance section is at the maintenance position, the first guided section is supported by the first lower guide section, and a part of the second guided section is supported by the second lower guide section.

7. The recording apparatus according to claim 5, wherein the maintenance section includes a pressed section configured to receive a pressing force from a liquid ejection surface from which the recording section ejects liquid and the pressed section overlaps with a line connecting one contact section constituting the second guided section provided on a side section in the first direction and one contact section constituting the second guided section provided on a side section in the second direction, as viewed from a normal direction with respect to the liquid ejection surface.

8. The recording apparatus according to claim 7, wherein the pressed section is a cap section configured to cap the liquid ejection surface.

9. The recording apparatus according to claim 2, wherein a centroid position of the maintenance section in the movement direction of the maintenance section is located in the first movement direction with respect to the center position in the movement direction of the maintenance section.

10. The recording apparatus according to claim 2, wherein a medium transport path that transports the medium curves downstream of the recording section so as to intersect with the movement path in the case that the movement path is extended in the first movement direction.

11. The recording apparatus according to claim 2, further comprising:

a medium receiving section provided vertically above the recording section and configured to receive the medium discharged after recording is performed, wherein a part or all of the medium receiving section is configured to be detachable and attachable or openable and closable and the maintenance section is removable to an outside of the apparatus by detaching or opening the part or all of the medium receiving section.

12. The recording apparatus according to claim 2, further comprising:

a transport belt configured to transport the medium is provided at a position opposed to the recording section, wherein the maintenance section moves and pivots in a direction in which the second guided section moves away from the transport belt.

13. The recording apparatus according to claim 2, wherein the recording section is configured to move between a recording position at which recording is performed on the medium and a separation position at which the recording section is separated from the recording position so as to increase distance between the recording section and the medium, the recording position of the recording section is restricted by the recording section being contact with a position restricting member and the maintenance section moves and pivots in a direction in which the second guided section moves away from the position restricting member.

14. A recording apparatus comprising:

a recording section configured to record by ejecting liquid onto a medium;

a maintenance section configured to move along a movement path, the movement path including a maintenance position at which maintenance of the recording section is performed and a retreat position retreated from the maintenance position; and a guide unit configured to guide the maintenance section along the movement path, wherein the maintenance section includes a first guided section which is guided by the guide unit and a second guided section which is guided by the guide unit, the second guided section being positioned in a first movement direction with respect to the first guided section, the first movement direction being a direction from the retreat position toward the maintenance position, when the maintenance section moves from the maintenance position in the first movement direction, the guide unit allows pivoting of the maintenance section with the first guided section as a pivot axis, the pivoting being accompanied by separation of the second guided section from the guide unit, and the first guided section is configured to separate from the guide unit, by moving in the first movement direction after the pivot of the maintenance section is allowed, the guide unit includes a lower guide section configured to support the first guided section and the second guided section at least between the retreat position and the maintenance position in the movement path, and an upper guide section that is located above the lower guide section and when the maintenance section moves from the maintenance position in the first movement direction, the second guided section is released from restriction by the upper guide section, and pivot of the maintenance section, which accompanies the upward movement of the second guided section, is allowed.

* * * * *